US011304254B2

(12) United States Patent
Omer et al.

(10) Patent No.: US 11,304,254 B2
(45) Date of Patent: Apr. 12, 2022

(54) CONTROLLING MOTION TOPOLOGY IN A STANDARDIZED WIRELESS COMMUNICATION NETWORK

(71) Applicant: Cognitive Systems Corp., Waterloo (CA)

(72) Inventors: Mohammad Omer, Waterloo (CA); Christopher Beg, Kitchener (CA); William James Halford, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

(21) Appl. No.: 17/462,661

(22) Filed: Aug. 31, 2021

(65) Prior Publication Data

US 2022/0070954 A1  Mar. 3, 2022

Related U.S. Application Data

(60) Provisional application No. 63/072,905, filed on Aug. 31, 2020.

(51) Int. Cl.
*H04W 72/04* (2009.01)
*H04W 76/15* (2018.01)
(Continued)

(52) U.S. Cl.
CPC ........... *H04W 76/15* (2018.02); *H04L 5/0048* (2013.01); *H04W 4/38* (2018.02)

(58) Field of Classification Search
CPC ........ H04W 76/15; H04W 4/38; H04L 5/0048
See application file for complete search history.

(56) References Cited

U.S. PATENT DOCUMENTS 4,054,879 A  10/1977 Wright et al.
4,636,774 A  1/1987 Galvin et al.
(Continued)

FOREIGN PATENT DOCUMENTS

CA  2834522  5/2014
CA  2945702  8/2015
(Continued)

OTHER PUBLICATIONS

WIPO, International Search Report and Written Opinion dated Jun. 25, 2020, in PCT/CA2020/050564, 10 pgs.
(Continued)

*Primary Examiner* — Walli Z Butt
(74) *Attorney, Agent, or Firm* — Henry Patent Law Firm PLLC

(57) ABSTRACT

In a general aspect, a motion sensing topology of a multi-access point (multi-AP) wireless communication network can be controlled. In some aspects, the multi-AP wireless communication network includes a first AP device, a second AP device, and a multi-AP controller. The multi-AP controller identifies a wireless communication topology, which includes identifying that a first client station device is associated with the first AP device. The multi-AP controller defines a motion sensing topology that is different from the wireless communication topology, and the motion sensing topology includes a wireless motion sensing link between the first client station device and the second AP device. The multi-AP controller initiates a motion sensing measurement based on the motion sensing topology, and the motion sensing measurement uses the wireless motion sensing link while the first client station device remains associated with the first AP device.

20 Claims, 17 Drawing Sheets

(51) Int. Cl.
  *H04W 4/38* (2018.01)
  *H04L 5/00* (2006.01)

(56) References Cited

U.S. PATENT DOCUMENTS

| | | |
|---|---|---|
| 4,649,388 A | 3/1987 | Atlas |
| 4,740,045 A | 4/1988 | Goodson et al. |
| 5,270,720 A | 12/1993 | Stove |
| 5,613,039 A | 3/1997 | Wang et al. |
| 5,696,514 A | 12/1997 | Nathanson et al. |
| 6,075,797 A | 6/2000 | Thomas |
| 6,380,882 B1 | 4/2002 | Hegnauer |
| 6,573,861 B1 | 6/2003 | Hommel et al. |
| 6,636,763 B1 | 10/2003 | Junker et al. |
| 6,914,854 B1 | 7/2005 | Heberley et al. |
| 7,099,676 B2 | 8/2006 | Law et al. |
| 7,652,617 B2 | 1/2010 | Kurtz et al. |
| 7,742,753 B2 | 6/2010 | Carrero et al. |
| 8,463,191 B2 | 6/2013 | Farajidana et al. |
| 8,660,578 B1 | 2/2014 | Yang et al. |
| 8,671,069 B2 | 3/2014 | Chang et al. |
| 8,710,984 B2 | 4/2014 | Wilson et al. |
| 8,812,654 B2 | 8/2014 | Gelvin et al. |
| 8,832,244 B2 | 9/2014 | Gelvin et al. |
| 8,836,344 B2 | 9/2014 | Habib et al. |
| 8,836,503 B2 | 9/2014 | Gelvin et al. |
| 9,019,148 B1 | 4/2015 | Bikhazi et al. |
| 9,030,321 B2 | 5/2015 | Breed |
| 9,253,592 B1 | 2/2016 | Moscovich et al. |
| 9,329,701 B2 | 5/2016 | Lautner |
| 9,389,085 B2 | 7/2016 | Khorashadi et al. |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,609,468 B1 | 3/2017 | Moscovich et al. |
| 9,628,365 B2 | 4/2017 | Gelvin et al. |
| 9,692,459 B2 | 6/2017 | Maltsev et al. |
| 9,743,294 B1 | 8/2017 | Omer et al. |
| 9,866,308 B1 | 1/2018 | Bultan et al. |
| 9,869,759 B2 | 1/2018 | Furuskog et al. |
| 9,927,519 B1 | 3/2018 | Omer et al. |
| 9,933,517 B1 | 4/2018 | Olekas et al. |
| 9,946,351 B2 | 4/2018 | Sakaguchi et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,077,204 B2 | 9/2018 | Maschmeyer et al. |
| 10,108,903 B1 | 10/2018 | Piao et al. |
| 10,109,167 B1 * | 10/2018 | Olekas ................ G08B 13/24 |
| 10,109,168 B1 | 10/2018 | Devison et al. |
| 10,111,228 B2 | 10/2018 | Griesdorf et al. |
| 10,129,853 B2 | 11/2018 | Manku et al. |
| 10,228,439 B1 | 3/2019 | Olekas et al. |
| 10,264,405 B1 | 4/2019 | Manku et al. |
| 10,318,890 B1 | 6/2019 | Kravets et al. |
| 10,380,856 B2 | 8/2019 | Devison et al. |
| 10,393,866 B1 | 8/2019 | Kravets et al. |
| 10,404,387 B1 | 9/2019 | Devison et al. |
| 10,438,468 B2 | 10/2019 | Olekas et al. |
| 10,459,074 B1 | 10/2019 | Omer et al. |
| 10,459,076 B2 | 10/2019 | Kravets et al. |
| 10,460,581 B1 | 10/2019 | Devison et al. |
| 10,498,467 B1 | 12/2019 | Ravkine |
| 10,499,364 B1 | 12/2019 | Ravkine |
| 10,506,384 B1 | 12/2019 | Omer et al. |
| 10,565,860 B1 | 2/2020 | Omer et al. |
| 10,567,914 B1 | 2/2020 | Omer et al. |
| 10,600,314 B1 | 3/2020 | Manku et al. |
| 10,605,907 B2 | 3/2020 | Kravets et al. |
| 10,605,908 B2 | 3/2020 | Kravets et al. |
| 10,743,143 B1 | 8/2020 | Devison et al. |
| 10,798,529 B1 | 10/2020 | Beg et al. |
| 10,849,006 B1 | 11/2020 | Beg et al. |
| 11,006,245 B2 | 5/2021 | Omer |
| 11,012,122 B1 | 5/2021 | Beg et al. |
| 11,018,734 B1 | 5/2021 | Beg |
| 11,070,399 B1 | 7/2021 | Omer et al. |
| 11,087,604 B2 | 8/2021 | Beg et al. |
| 2002/0080014 A1 | 6/2002 | McCarthy et al. |
| 2003/0108119 A1 | 6/2003 | Mohebbi et al. |
| 2005/0128067 A1 | 6/2005 | Zakrewski |
| 2006/0152404 A1 | 7/2006 | Fullerton et al. |
| 2006/0217132 A1 | 9/2006 | Drummond-Murray et al. |
| 2006/0284757 A1 | 12/2006 | Zemany |
| 2007/0296571 A1 | 12/2007 | Kolen |
| 2008/0057978 A1 | 3/2008 | Karaoguz et al. |
| 2008/0119130 A1 | 5/2008 | Sinha |
| 2008/0240008 A1 | 10/2008 | Backes et al. |
| 2008/0258907 A1 | 10/2008 | Kalpaxis |
| 2008/0300055 A1 | 12/2008 | Lutnick et al. |
| 2008/0303655 A1 | 12/2008 | Johnson |
| 2009/0062696 A1 | 3/2009 | Nathan et al. |
| 2009/0180444 A1 | 7/2009 | McManus et al. |
| 2010/0073686 A1 | 3/2010 | Medeiros et al. |
| 2010/0127853 A1 | 5/2010 | Hanson et al. |
| 2010/0130229 A1 | 5/2010 | Sridhara et al. |
| 2010/0207804 A1 | 8/2010 | Hayward et al. |
| 2010/0234045 A1 | 9/2010 | Karr et al. |
| 2010/0306320 A1 | 12/2010 | Leppanen et al. |
| 2010/0315284 A1 | 12/2010 | Trizna et al. |
| 2011/0019587 A1 | 1/2011 | Wang |
| 2011/0035491 A1 | 2/2011 | Gelvin et al. |
| 2011/0090081 A1 | 4/2011 | Khorashadi et al. |
| 2011/0260856 A1 | 10/2011 | Rossmann et al. |
| 2011/0263946 A1 | 10/2011 | El Kaliouby et al. |
| 2012/0115512 A1 | 5/2012 | Grainger et al. |
| 2012/0146788 A1 | 6/2012 | Wilson et al. |
| 2012/0182429 A1 | 7/2012 | Forutanpour et al. |
| 2012/0184296 A1 | 7/2012 | Milosiu |
| 2012/0283896 A1 | 11/2012 | Persaud |
| 2013/0017836 A1 | 1/2013 | Chang et al. |
| 2013/0045759 A1 | 2/2013 | Smith |
| 2013/0090151 A1 | 4/2013 | Ngai et al. |
| 2013/0094538 A1 | 4/2013 | Wang |
| 2013/0113647 A1 | 5/2013 | Sentelle et al. |
| 2013/0162459 A1 | 6/2013 | Aharony et al. |
| 2013/0178231 A1 | 7/2013 | Morgan |
| 2013/0283256 A1 | 10/2013 | Proud |
| 2014/0126323 A1 | 5/2014 | Li et al. |
| 2014/0135042 A1 | 5/2014 | Buchheim et al. |
| 2014/0148195 A1 | 5/2014 | Bassan-Eskenazi et al. |
| 2014/0247179 A1 | 9/2014 | Furuskog |
| 2014/0266669 A1 | 9/2014 | Fadell et al. |
| 2014/0274218 A1 | 9/2014 | Kadiwala et al. |
| 2014/0286380 A1 | 9/2014 | Prager et al. |
| 2014/0329540 A1 | 11/2014 | Duggan et al. |
| 2014/0355713 A1 | 12/2014 | Bao et al. |
| 2014/0361920 A1 | 12/2014 | Katuri et al. |
| 2015/0043377 A1 | 2/2015 | Cholas et al. |
| 2015/0049701 A1 | 2/2015 | Tian et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0269825 A1 | 9/2015 | Tran |
| 2015/0288745 A1 | 10/2015 | Moghaddam et al. |
| 2015/0304886 A1 | 10/2015 | Liu et al. |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 | 12/2015 | Huang et al. |
| 2015/0366542 A1 | 12/2015 | Brown et al. |
| 2016/0014554 A1 | 1/2016 | Sen et al. |
| 2016/0018508 A1 | 1/2016 | Chen et al. |
| 2016/0088438 A1 | 3/2016 | O'Keeffe |
| 2016/0088631 A1 | 3/2016 | Hedayat et al. |
| 2016/0135205 A1 | 5/2016 | Barbu et al. |
| 2016/0150418 A1 | 5/2016 | Kang et al. |

(56) References Cited

U.S. PATENT DOCUMENTS

| | | |
|---|---|---|
| 2016/0183059 A1 | 6/2016 | Nagy et al. |
| 2016/0187475 A1 | 6/2016 | Horng et al. |
| 2016/0203689 A1 | 7/2016 | Hintz et al. |
| 2016/0210838 A1 | 7/2016 | Yan et al. |
| 2016/0217683 A1 | 7/2016 | Li |
| 2016/0262355 A1 | 9/2016 | Swan |
| 2016/0363663 A1 | 12/2016 | Mindell et al. |
| 2017/0042488 A1 | 2/2017 | Muhsin |
| 2017/0052247 A1 | 2/2017 | Kong et al. |
| 2017/0055126 A1 | 2/2017 | O'Keeffe |
| 2017/0055131 A1 | 2/2017 | Kong et al. |
| 2017/0059190 A1 | 3/2017 | Stefanski et al. |
| 2017/0086281 A1 | 3/2017 | Avrahamy |
| 2017/0090026 A1 | 3/2017 | Joshi et al. |
| 2017/0111852 A1 | 4/2017 | Selen et al. |
| 2017/0123528 A1 | 5/2017 | Hu et al. |
| 2017/0126488 A1 | 5/2017 | Cordeiro et al. |
| 2017/0146656 A1 | 5/2017 | Belsley et al. |
| 2017/0150255 A1 | 5/2017 | Wang et al. |
| 2017/0155439 A1 | 6/2017 | Chang et al. |
| 2017/0177618 A1 | 6/2017 | Hu et al. |
| 2017/0180882 A1 | 6/2017 | Lunner et al. |
| 2017/0195893 A1 | 7/2017 | Lee et al. |
| 2017/0223628 A1 | 8/2017 | Snyder et al. |
| 2017/0251392 A1 | 8/2017 | Nabetani |
| 2017/0278374 A1 | 9/2017 | Skaaksrud |
| 2017/0280351 A1 | 9/2017 | Skaaksrud |
| 2017/0311279 A1 | 10/2017 | Allegue Martinez et al. |
| 2017/0311574 A1 | 11/2017 | Swan |
| 2017/0343658 A1 | 11/2017 | Ramirez et al. |
| 2017/0359804 A1* | 12/2017 | Manku ................ H04W 24/08 |
| 2017/0366938 A1 | 12/2017 | Wootten et al. |
| 2018/0027389 A1 | 1/2018 | Shirakata et al. |
| 2018/0086264 A1 | 3/2018 | Pedersen |
| 2018/0106885 A1 | 4/2018 | Blayvas |
| 2018/0120420 A1 | 5/2018 | McMahon et al. |
| 2018/0168552 A1 | 6/2018 | Shi et al. |
| 2018/0180706 A1 | 6/2018 | Li et al. |
| 2018/0270821 A1 | 9/2018 | Griesdorf et al. |
| 2018/0288587 A1 | 10/2018 | Allegue Martinez et al. |
| 2018/0330293 A1 | 11/2018 | Kulkarni et al. |
| 2019/0033446 A1 | 1/2019 | Bultan et al. |
| 2019/0122514 A1 | 4/2019 | Olekas et al. |
| 2019/0146075 A1 | 5/2019 | Kravets et al. |
| 2019/0146076 A1 | 5/2019 | Kravets et al. |
| 2019/0146077 A1 | 5/2019 | Kravets et al. |
| 2019/0147713 A1 | 5/2019 | Devison et al. |
| 2019/0156943 A1 | 5/2019 | Kocherscheidt et al. |
| 2019/0170869 A1 | 6/2019 | Kravets et al. |
| 2019/0234744 A1* | 8/2019 | Wang ................ G01C 21/206 |
| 2019/0272718 A1 | 9/2019 | Hurtig et al. |
| 2019/0327124 A1* | 10/2019 | Lai ................ H04L 27/362 |
| 2020/0175405 A1 | 6/2020 | Omer et al. |
| 2020/0178033 A1 | 6/2020 | Omer et al. |
| 2020/0252233 A1* | 8/2020 | O'Keeffe ................ H04L 67/306 |
| 2020/0264292 A1 | 8/2020 | Kravets et al. |
| 2020/0351576 A1 | 11/2020 | Beg et al. |
| 2020/0351692 A1 | 11/2020 | Beg et al. |

FOREIGN PATENT DOCUMENTS

| | | |
|---|---|---|
| JP | 1997-507298 | 7/1997 |
| JP | 2004286567 | 10/2004 |
| JP | 2013072865 | 4/2013 |
| WO | 2014021574 | 2/2014 |
| WO | 2014201574 | 12/2014 |
| WO | 2015/168700 | 11/2015 |
| WO | 2015168700 | 11/2015 |
| WO | 2016005977 | 1/2016 |
| WO | 2016066822 | 5/2016 |
| WO | 2016110844 | 7/2016 |
| WO | 2017106976 | 6/2017 |
| WO | 2017132765 | 8/2017 |
| WO | 2017177303 | 10/2017 |
| WO | 2017210770 | 12/2017 |
| WO | 2018071456 | 4/2018 |
| WO | 2018094502 | 5/2018 |
| WO | 2019041019 | 3/2019 |
| WO | 2019075551 | 4/2019 |

OTHER PUBLICATIONS

WIPO, International Search Report and Written Opinion dated Nov. 8, 2021, in PCT/CA2021/051204, 11 pgs.

USPTO, Notice of Allowance dated Jun. 8, 2020, in U.S. Appl. No. 16/856,529, 29 pgs.

Allegue, et al., "WiFi Motion Intelligence: The Fundamentals, A Case Study by Telefonica, Quantenna, and Aerial Technologies", 7 pgs.

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

Domenico, et al., "Exploring Training Options for RF Sensing Using CSI", IEEE Communications Magazine, 2018, vol. 56, Issue 5, pp. 116-123, 8 pgs.

Iqbal, et al., "Indoor Motion Classification Using Passive RF Sensing Incorporating Deep Learning", ISSN 2577-2465, Electronic IEEE, Jun. 3, 2018, 5 pgs.

Kosba, et al., "Robust WLAN Device-free Passive Motion Detection", IEEE Wireless Communications and Networking Conference, Apr. 2012, 6 pgs.

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.

"Draft Standard for Info tech—Telecomm, and information exchange between systems-", Local and metropolitan area networks—Specific requirements—Part 11: Wireless LAN Medium Access Control (MAC) and Physical Layer (PHY) Specifications; pp. 127-181, May 2017, 55 pgs.

Ma, et al., "WiFi Sensing with Channel State Information: A Survey", ACM Comput. Surv., vol. 52, No. 3, Article 46, Jun. 2019, 36 pgs.

Zhang, et al., "Enabling Joint Communication and Radar Sensing in Mobile Networks—A Survey", arXiv:2006.07559v3, Jan. 16, 2021, 32 pgs.

* cited by examiner

CONTROLLING MOTION TOPOLOGY IN A STANDARDIZED WIRELESS COMMUNICATION NETWORK

CROSS REFERENCE TO RELATED APPLICATIONS

This application claims priority to U.S. Provisional Patent Application No. 63/072,905, filed Aug. 31, 2020, entitled "Controlling Motion Topology in a Standardized Wireless Communication Network." The above-referenced priority application is hereby incorporated by reference.

BACKGROUND

The following description relates to controlling motion sensing topology in a standardized wireless communication network.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems.

DETAILED DESCRIPTION

Figure 1:
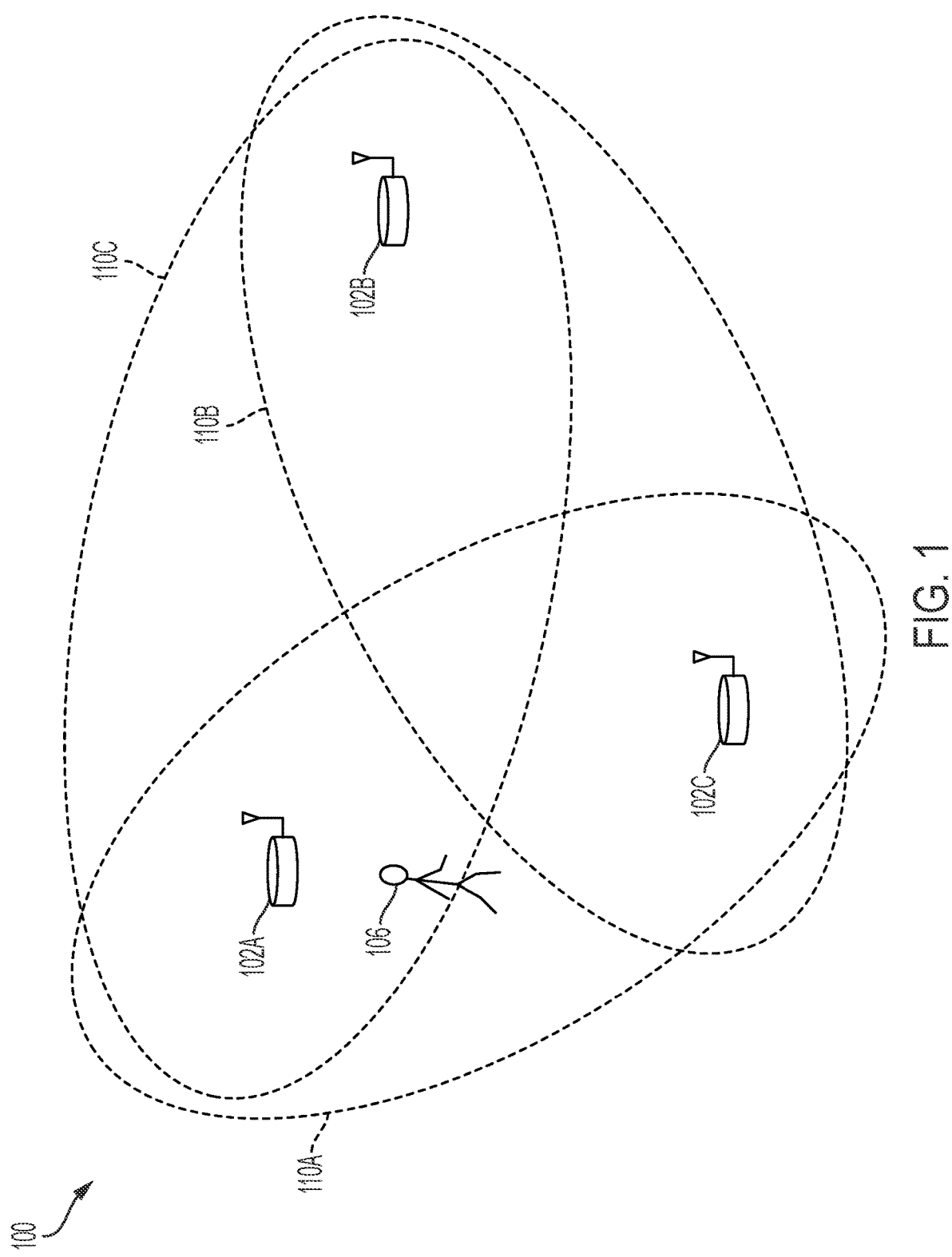
FIG. 1 is a block diagram showing an example wireless communication system.

In some aspects of what is described here, a wireless sensing system can be used for wireless sensing applications by processing wireless signals (e.g., radio frequency signals) transmitted through a space between wireless communication devices. Example wireless sensing applications include motion detection, which can include one or more of the following: detecting motion of objects in the space, motion tracking, motion localization, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, WiFi imaging, and other types of wireless sensing applications. For instance, the wireless sensing system may operate as a motion detection system to detect the existence and location of motion based on Wi-Fi signals or other types of wireless signals.

The examples described above may be useful for home monitoring. Home monitoring using the wireless sensing systems described herein provides several advantages, including full home coverage through walls and darkness, discreet detection without cameras, higher accuracy and reduced false alerts (e.g., in comparison with sensors that do not use Wi-Fi signals to sense their environments), and adjustable sensitivity. By layering Wi-Fi motion detection capabilities into routers and gateways, a robust motion detection system may be provided.

The examples described above may also be useful in wellness monitoring. Caregivers want to know their loved ones are safe, while seniors and people with special needs want to maintain their independence at home with dignity. Wellness monitoring using the wireless sensing systems described herein provides a solution that uses wireless signals to detect motion without using cameras or infringing on privacy, generate alerts when unusual activity is detected, track sleep patterns, and generate preventative health data. For example, caregivers can monitor motion, visits from health care professionals, and unusual behavior such as staying in bed longer than normal. Furthermore, motion is monitored unobtrusively without the need for wearable devices, and the wireless sensing systems described herein offer a more affordable and convenient alternative to assisted living facilities and other security and health monitoring tools.

The examples described above may also be useful in setting up a smart home. In some examples, the wireless sensing systems described herein use predictive analytics and artificial intelligence (AI), to learn movement patterns and trigger smart home functions accordingly. Examples of smart home functions that may be triggered include adjusting the thermostat when a person walks through the front door, turning other smart devices on or off based on preferences, automatically adjusting lighting, adjusting HVAC systems based on present occupants, etc.

In some aspects of what is described here, a wireless motion sensing topology is controlled in a standardized wireless communication network. In some implementations, controlling a wireless motion sensing topology includes a wireless motion sensing link between a client station (STA) device and an access point (AP) device, which are not associated with each other. In some instances, wireless signals transmitted on the wireless motion sensing link during scheduled illumination sessions can be received by either the STA device or the AP device and may be analyzed to determine channel information for the wireless motion sensing link in the wireless motion sensing topology. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference. The channel information of the wireless motion sensing link may be analyzed (e.g., by an access point or other device in a wireless communication network, or a remote device that receives information from the network) to detect, for example, whether motion has occurred in the space, to determine a relative location of the detected motion, or both. In some aspects, the channel information for each of the communication links may be analyzed to detect whether an object is present or absent, e.g., when no motion is detected in the space.

Example motion detection and localization algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," U.S. Pat. No. 10,743,143 entitled "Determining a Motion Zone for a Location of Motion Detected by Wireless Signals," U.S. Pat. No. 10,605,908 entitled "Motion Detection Based on Beamforming Dynamic Information from Wireless Standard Client Devices," U.S. Pat. No. 10,605,907 entitled "Motion Detection by a Central Controller Using Beamforming Dynamic Information," U.S. Pat. No. 10,600,314 entitled "Modifying Sensitivity Settings in a Motion Detection System," U.S. Pat. No. 10,567,914 entitled "Initializing Probability Vectors for Determining a Location of Motion Detected from Wireless Signals," U.S. Pat. No. 10,565,860 entitled "Offline Tuning System for Detecting New Motion Zones in a Motion Detection System," U.S. Pat. No. 10,506,384 entitled "Determining a Location of Motion Detected from Wireless Signals Based on Prior Probability," U.S. Pat. No. 10,499,364 entitled "Identifying Static Leaf Nodes in a Motion Detection System," U.S. Pat. No. 10,498,467 entitled "Classifying Static Leaf Nodes in a Motion Detection System," U.S. Pat. No. 10,460,581 entitled "Determining a Confidence for a Motion Zone Identified as a Location of Motion for Motion Detected by Wireless Signals," U.S. Pat. No. 10,459,076 entitled "Motion Detection based on Beamforming Dynamic Information," U.S. Pat. No. 10,459,074 entitled "Determining a Location of Motion Detected from Wireless Signals Based on Wireless Link Counting," U.S. Pat. No. 10,438,468 entitled "Motion Localization in a Wireless Mesh Network Based on Motion Indicator Values," U.S. Pat. No. 10,404,387 entitled "Determining Motion Zones in a Space Traversed by Wireless Signals," U.S. Pat. No. 10,393,866 entitled "Detecting Presence Based on Wireless Signal Analysis," U.S. Pat. No. 10,380,856 entitled "Motion Localization Based on Channel Response Characteristics," U.S. Pat. No. 10,318,890 entitled "Training Data for a Motion Detection System using Data from a Sensor Device," U.S. Pat. No. 10,264,405 entitled "Motion Detection in Mesh Networks," U.S. Pat. No. 10,228,439 entitled "Motion Detection Based on Filtered Statistical Parameters of Wireless Signals," U.S. Pat. No. 10,129,853 entitled "Operating a Motion Detection Channel in a Wireless Communication Network," U.S. Pat. No. 10,111,228 entitled "Selecting Wireless Communication Channels Based on Signal Quality Metrics," and other techniques.

Example wireless sensing systems are described below in the context of motion detection. However, one or more of the operation and technical improvements and advantages achieved when the wireless sensing system is operating as a motion detection system are also applicable in examples where the wireless sensing system is used for another wireless sensing application.

In some instances, aspects of the systems and techniques described here provide technical improvements and advantages over existing approaches. For example, a wireless motion sensing topology that is distinct from a wireless communication topology can be used to increase the sensitivity, accuracy, or efficiency of the wireless motion sensing system for various aspects of motion, an example being localization of motion in a space. In some cases, the systems and techniques described here can be used to define and control a motion sensing topology based on an existing wireless communication topology for optimized motion sensing performance. For example, the motion sensing topology can be optimized according to the sensing-based metrics and can be defined according to user-defined application inputs. The technical improvements and advantages achieved in examples where the wireless sensing system is used for motion detection may also be achieved in examples where the wireless sensing system is used for other wireless sensing applications.

FIG. 1 is a block diagram showing an example wireless communication system 100. The example wireless communication system 100 includes three wireless communication devices 102A, 102B, 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless communication network, for example, according to a wireless communication network standard or another type of wireless communication protocol. For example, the wireless communication network may be configured to operate as a Wireless Local Area Network (WLAN), a Personal Area Network (PAN), a metropolitan area network (MAN), or another type of wireless communication network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a multiple-access point (multi-AP) wireless communication network, such as, for example, a commercially available mesh network system. In some instances, one or more of the wireless communication devices 102 can be implemented as wireless access points (APs) in a mesh network, while the other wireless communication device(s) 102 are implemented as client station devices (e.g., mobile devices, smart devices, etc.) that access the mesh network through one of the AP devices. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless communication network.

In the example shown in FIG. 1, the wireless communication devices transmit wireless signals to each other over wireless communication links (e.g., according to a wireless communication network standard or a non-standard wireless communication protocol), and the wireless signals communicated between the devices can be used as motion probes to detect motion of objects in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or other mediums through which wireless electromagnetic signals may propagate.

In the example shown in FIG. 1, when an object moves in any of the motion detection zones 110, the motion detection system may detect the motion based on signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals may propagate through a structure (e.g., a wall) before or after interacting with a moving object, which may allow the moving object's movement to be detected without an optical line-of-sight between the moving object and the transmission or receiving hardware. In some instances, the motion detection system may communicate the motion detection event to another device or system, such as a security system or a control center.

In some cases, the wireless communication devices 102 themselves are configured to perform one or more operations of the motion detection system, for example, by executing computer-readable instructions (e.g., software or firmware) on the wireless communication devices. For example, each device may process received wireless signals to detect motion based on changes in the communication channel. In some cases, another device (e.g., a remote server, a cloud-based computer system, a network-attached device, etc.) is configured to perform one or more operations of the motion detection system. For example, each wireless communication device 102 may send channel information to a specified device, system, or service that performs operations of the motion detection system.

In an example aspect of operation, wireless communication devices 102A, 102B may broadcast wireless signals or address wireless signals to the other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 11B). In some instances, the wireless communication device 102C (or another system or device) may perform one or more operations of a motion detection system.

Figure 2A:
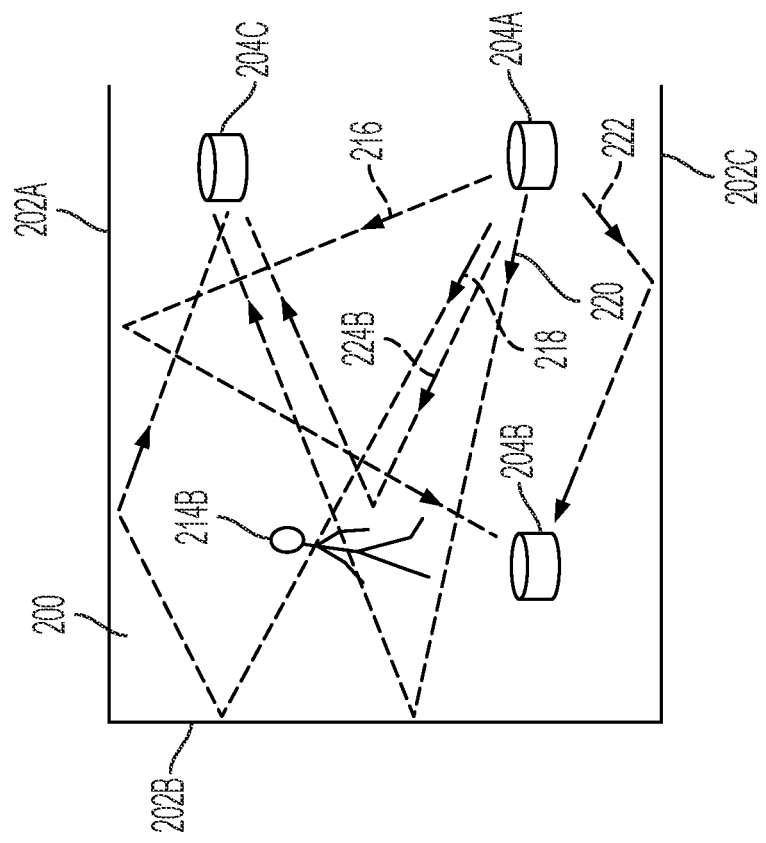
FIGS. 2A-2B are block diagrams showing example wireless signals communicated between wireless communication devices.
Figure 2B:
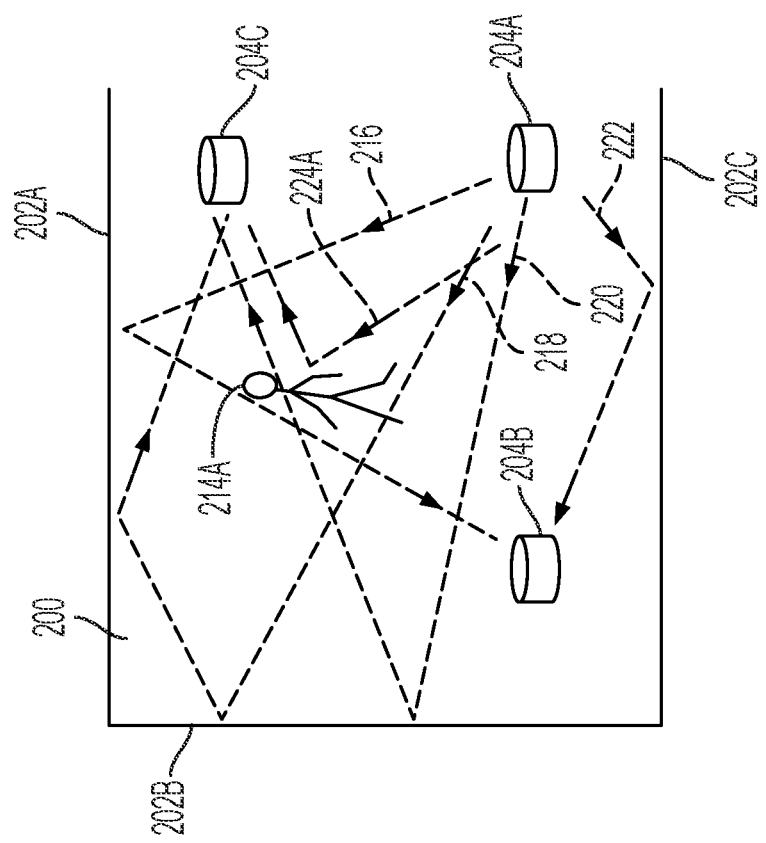

FIGS. 2A and 2B are block diagrams showing example wireless signals communicated between wireless communication devices 204A, 204B, 204C within a space 200. The wireless communication devices 204A, 204B, 204C may be, for example, the wireless communication devices 102A, 102B, 102C shown in FIG. 1, or may be other types of wireless communication devices.

In some cases, a combination of one or more of the wireless communication devices 204A, 204B, 204C can be part of, or may be used by, a wireless communication system operating as a motion detection system in a space 200. The example space 200 may be completely or partially enclosed or open at one or more boundaries of the space 200. The space 200 may be, or may include, an interior of a room, multiple rooms, a building, an indoor area, outdoor area, or the like. A first wall 202A, a second wall 202B, and a third wall 202C at least partially enclose the space 200 in the example shown.

The example wireless communication devices 204A, 204B, 204C can form a wireless communication network with a wireless communication topology and transmit wireless signals for wireless communication purposes through the space 200. The wireless communication topology may include a first set of links or channels between the wireless communication devices 204A, 204B, 204C. The wireless communication network formed by the example wireless communication devices 204A, 204B, 204C can also have a motion sensing topology for motion sensing purposes through the space 200. The motion sensing topology may include a second set of links or channels between the wireless communication devices 204A, 204B, 204C. In some implementations, the first set of links or channels of the wireless communication topology and the second set of links or channels of the motion sensing topology are the same; share a subset of links or channels; or are otherwise different. Examples systems and techniques for controlling the wireless communication topology and the motion sensing topology are shown in FIGS. 3A-3B, 4A-4F, 5-7, and 8A-8B.

In the example shown in FIGS. 2A and 2B, the first wireless communication device 204A transmits wireless motion probe signals repeatedly (e.g., periodically, intermittently, at scheduled, unscheduled or random intervals, etc.). The second and third wireless communication devices 204B, 204C receive signals based on the motion probe signals transmitted by the wireless communication device 204A.

As shown, an object is in a first position 214A at an initial time ($t_0$) in FIG. 2A, and the object has moved to a second position 214B at subsequent time ($t_1$) in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. In the example shown in FIGS. 2A and 2B, the wireless communication devices 204A, 204B, 204C are stationary and are, consequently, at the same position at the initial time t0 and at the subsequent time t1. However, in other examples, one or more of the wireless communication devices 204A, 204B, 204C may be mobile and may move between initial time t0 and subsequent time t1.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t0 in FIG. 2A and time t1 in FIG. 2B, the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

The transmitted signal may have a number of frequency components in a frequency bandwidth, and the transmitted signal may include one or more bands within the frequency bandwidth. The transmitted signal may be transmitted from the first wireless communication device 204A in an omnidirectional manner, in a directional manner, or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset applied to a wireless signal along a signal path can change, and hence, the transfer function of the space 200 can change. When the same wireless signal is transmitted from the first wireless communication device 204A, if the transfer function of the space 200 changes, the output of that transfer function, e.g. the received signal, can also change. A change in the received signal can be used to detect movement of an object. Conversely, in some cases, if the transfer function of the space does not change, the output of the transfer function—the received signal—may not change.

Mathematically, a transmitted signal f(t) transmitted from the first wireless communication device 204A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless communication device can then be analyzed, for example, to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $u)_n$). For a frequency component at frequency $\omega_n$, a complex value $Y_n$ may be represented as follows in Equation (5):

$$Y_n = \sum_k c_n \alpha_{n,k} e^{j\phi_{n,k}}. \quad (5)$$

The complex value $Y_n$ for a given frequency component $\omega_n$ indicates a relative magnitude and phase offset of the received signal at that frequency component $\omega_n$. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Conversely, a stable channel response may indicate lack of movement. Thus, in some implementations, the complex values $Y_n$ for each of multiple devices in a wireless communication network can be processed to detect whether motion has occurred in a space traversed by the transmitted signals f(t).

In another aspect of FIGS. 2A and 2B, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. In some instances, changes to the steering or feedback properties used in the beamforming process indicate changes, which may be caused by moving objects in the space accessed by the wireless signals. For example, motion may be detected by identifying substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

Figure 3A:
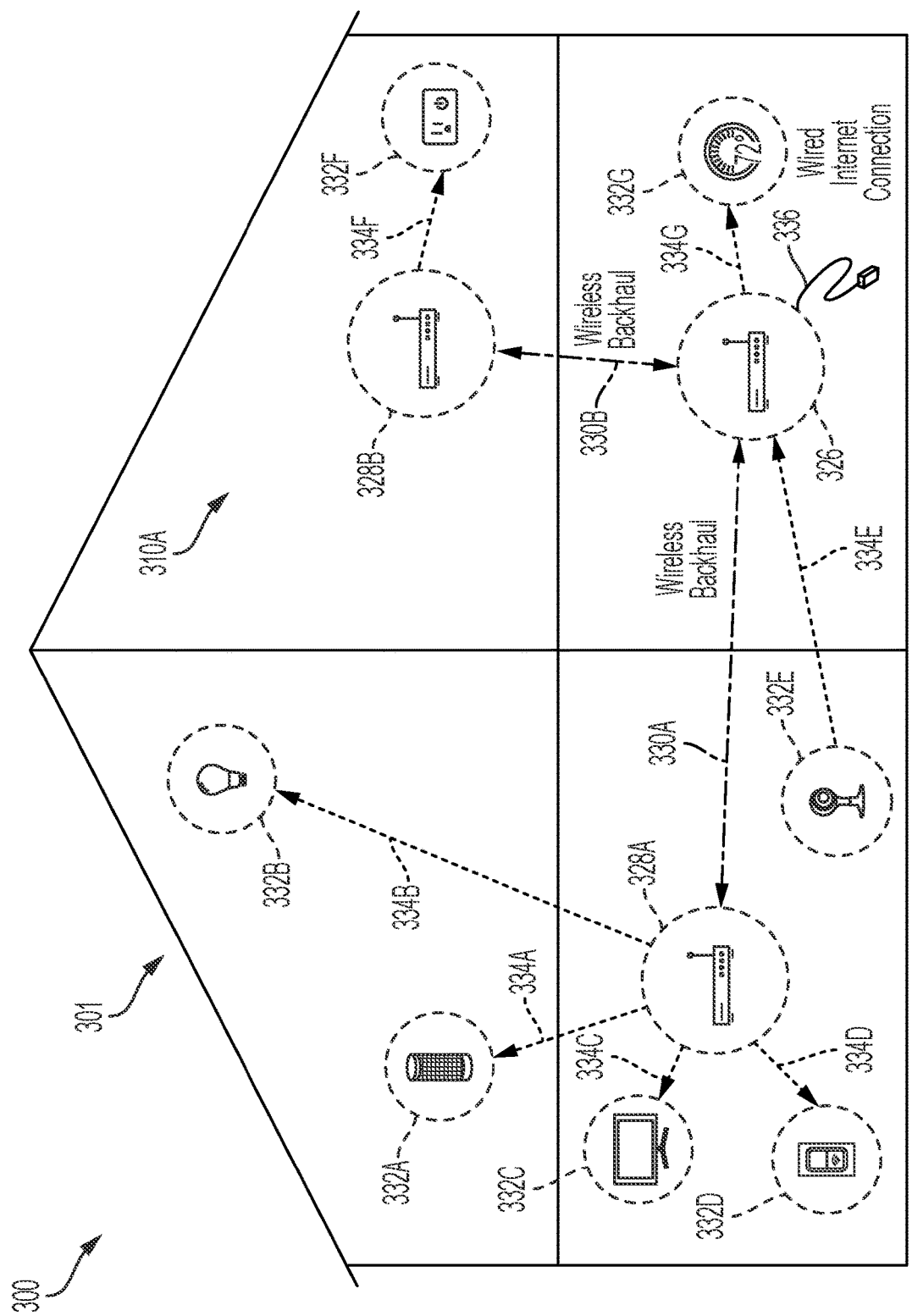
FIG. 3A is a block diagram showing aspects of an example wireless communication topology of a wireless communication network.

FIG. 3A is a block diagram showing aspects of a wireless communication topology 310A of an example wireless communication network 300. The example wireless communication network 300 is a multi-AP wireless communication network that includes multiple access point (AP) devices and multiple client station (STA) devices. The wireless communication devices (the AP devices and the STA devices) in the example wireless communication network 300 are organized in a wireless communication topology 310A, which can be configured to improve or optimize wireless communication performance in an example space 301. The multi-AP wireless communication network may operate based on a wireless communication standard, examples being Wi-Fi Direct (which may have STA-to-STA information), the IEEE 802.11md standard, and the IEEE 802.11ax standard. The IEEE 802.11md standard is published in a document entitled "IEEE P802.11-REVmd™/D0.0, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications," May 2017, which is hereby incorporated by reference in its entirety. The IEEE 802.11ax standard is published in a document entitled "P802.11ax/D6.0, IEEE Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment Enhancements for High Efficiency WLAN," November 2019, which is hereby incorporated by reference in its entirety.

The example space 301 shown in FIG. 3A is a home that includes multiple distinct spatial regions or zones. In the example shown, the wireless motion detection system uses a multi-AP home network topology (e.g., a mesh network or a Self-Organizing-Network (SON)), which includes three access points (APs): a central access point 326 and two extension access points 328A, 328B. In an example multi-AP home network, each AP can support multiple bands (2.4G, 5G, 6G), and multiple bands may be enabled at the same time. Each AP may use a different Wi-Fi channel to serve its associated STA devices, as this may allow for better spectrum efficiency.

In a multi-AP home Wi-Fi network, one AP from the multiple APs may be selected and denoted as the central AP. In some instances, the central AP may be or include a multi-AP controller. A multi-AP controller is configured for performing functions, including network and configuration, backhaul topology control, spectrum efficiency management, quality of service (QoS) optimization, network topology control, and other functions. In certain instances, the device that provides multi-AP controller functionality may be selected from the multiple APs within the multi-AP wireless communication network according to a predefined criteria. In some instances, the multi-AP controller functionality may be provided by a remote device or system, e.g., by a cloud-based system. The selection of the central AP or the multi-AP controller can be managed by manufacturer software running on each AP device. For example, the central AP can be the AP device that has a wired Internet connection 336. In the example shown in FIG. 3A, the other AP devices (e.g., the extension APs) 328A, 328B connect to the central AP 326 wirelessly, through respective wireless backhaul connections 330A, 330B. The central AP 326 may select a wireless channel different from the extension APs to serve its associated clients. The extension APs 328A, 328B connect to the central AP 326 using respective wireless backhaul connections 330A, 330B to move network traffic between APs and provide a gateway to the Internet.

The extension APs 328A, 328B extend the range of the central AP 326, by allowing STA devices to connect to a potentially closer AP or different channel, thus yielding the wireless communication topology 310A of the example wireless communication network 300 shown in FIG. 3A. In some examples, respective STA devices are designated or associated to respective APs in the wireless communication topology 310A. Each extension AP 328A, 328B may select a different channel to serve its associated STA devices. In some examples, the multi-AP wireless communication network performs band-steering or client-steering decisions to optimize wireless communication performance based on one or more communication-based metrics. In some implementations, the multi-AP wireless communication network contains an optimizer that, at any time, can perform steering events to optimize the one or more communication-based metrics. In some implementations, the one or more communication-based metrics may include channel utilization, upload demands, download demands, load-balancing, resource-balancing, physical distance, signal strength, etc.

In the example shown in FIG. 3A, client station devices (e.g., Wi-Fi client devices) 332A, 332B, 332C, 332D, 332E, 332F, 332G connect to either the central AP 326 or one of the extension APs 328A, 328B, using a respective wireless link 334A, 334B, 334C, 334D, 334E, 334F, 334G as shown in FIG. 3A. The client station devices 332A, 332B, 332C, 332D, 332E, 332F, 332G may be referred to as STA devices, and may include wireless-enabled devices (e.g., mobile devices, a smartphone, a smart watch, a tablet, a laptop computer, a smart thermostat, a wireless-enabled camera, a smart TV, a wireless-enabled speaker, a wireless-enabled power socket, etc.).

In the example shown in FIG. 3A, the devices 332A, 332B, 332C, 332D are associated (e.g. by respective wireless links 334A, 334B, 334C, 334D) with the extension AP 328A. Similarly, the devices 332E and 332G are associated (e.g. by respective wireless links 334E, 334G) with the central AP 326. In like manner, the device 332F is associated (e.g. by wireless link 334F) with the extension AP 328B. Each of the channels (or frequency bands) used for the wireless backhaul connections 330A, 330B may be different than the channels (or frequency bands) of the wireless links 334 used for serving the associated STA devices.

In the example shown in FIG. 3A, each of the wireless links 334A, 334B, 334C, 334D, 334E, 334F, 334G makes use of the frequency channel selected by the respective AP that the corresponding device 332A, 332B, 332C, 332D, 332E, 332F, 332G is associated with. Each AP may select its own channel independently to serve the respective devices, and the wireless links 334 in the wireless communication topology 310A may be used for data communications.

In some implementations, one or more of the APs in the wireless communication network 300 has the wired Internet connection 336. In the example shown in FIG. 3A, the central AP 326 is connected to the wired Internet connection 336, which extends internet connectivity to the home network. As such, Internet bound traffic from devices connected to an AP without a wired Internet connection (e.g., the extension APs 328A, 328B) are carried on a respective wireless backhaul connection (e.g., the wireless backhaul connection 330A or 330B) to a device with a wired Internet connection.

In some implementations, in the multi-AP wireless communication network 300 shown in FIG. 3A, which may be referred to as an enhanced service set (ESS), an STA device may be associated with one AP device at a time. The association can, however, change from one AP device to another AP device within the same ESS using a "fast basic service set (BSS) transition" exchange. This can occur when the multi-AP wireless communication network 300 decides to move an STA device from one AP device to another AP device for load balancing, or for other communication optimization purposes (e.g., channel utilization, upload demands, download demands, load-balancing, resource-balancing, physical distance, or signal strength). An example topology optimization process is described in the example process 414 in FIG. 4C.

In some implementations, the wireless communication topology 310A shown in FIG. 3A may not be suitable or optimal for motion sensing. For example, in the example of FIG. 3A, the associations of the devices with the APs are determined based on one or more communication metrics, which may not necessarily be compatible with optimized motion detection.

In some cases, device association between a STA device and an AP device in the multi-AP wireless communication network 300 can be controlled and modified according to one or more wireless sensing-based metrics. For example, association between a STA device and an AP device can be modified and a new wireless link and thus a new association can be created between a device and another AP, on which a motion sensing measurement can be performed. In this case, the wireless communication topology is changed or updated for motion sensing. Accordingly, the new wireless link in the updated wireless communication topology is used for both wireless network traffic and motion sensing. In this case, the new wireless link serves as a wireless communication link in the wireless communication topology of the wireless communication network 300 and a wireless motion sensing link in the motion sensing topology of the wireless communication network 300.

Figure 3B:
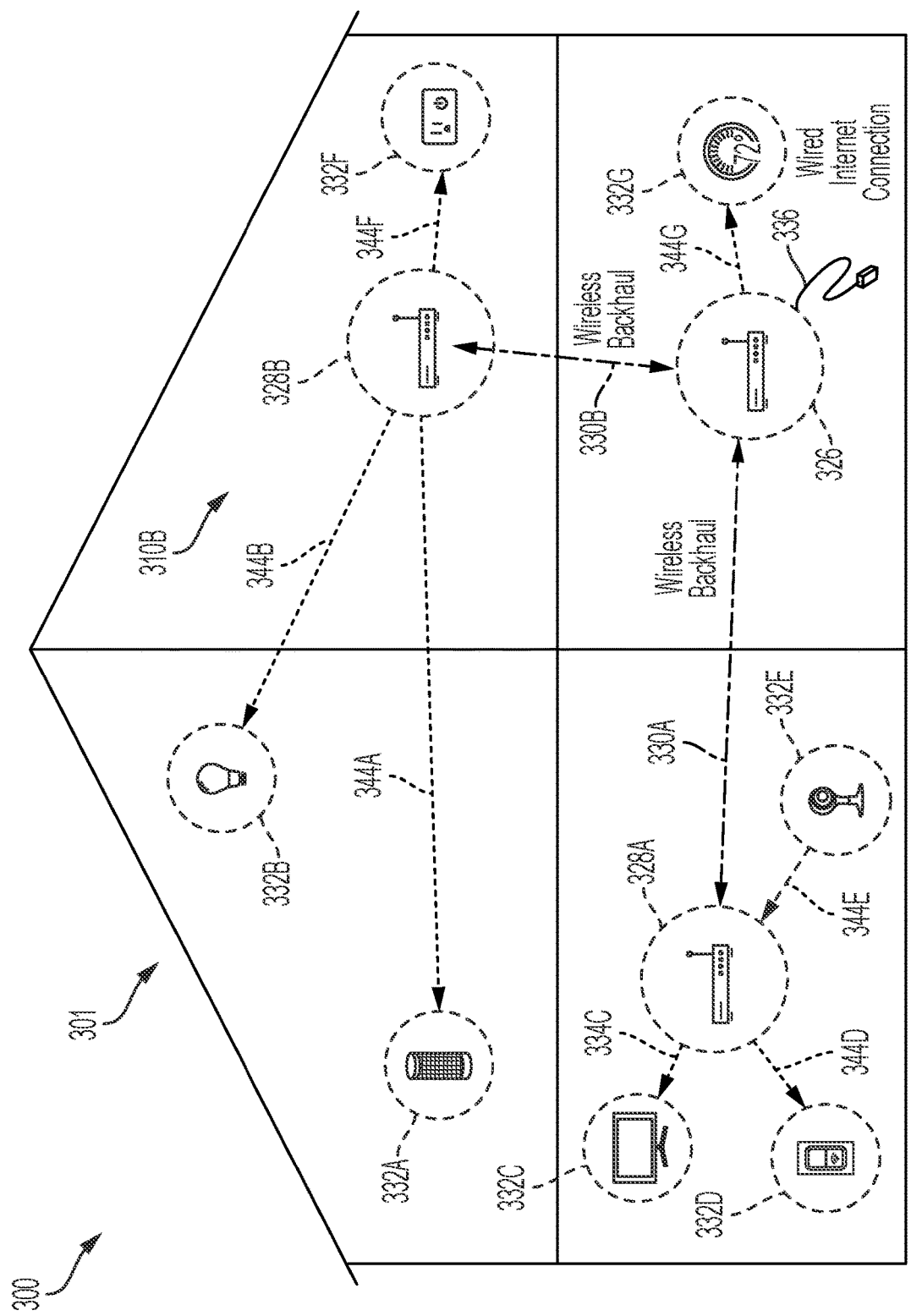
FIG. 3B is a block diagram showing aspects of another example wireless communication topology of a wireless communication network.

FIG. 3B is a block diagram showing aspects of another example wireless communication topology 310B of the wireless communication network 300. In the example of FIG. 3B, the wireless communication topology 310B of the wireless communication network 300 is different from the wireless communication topology 310A of the wireless communication network 300 shown in FIG. 3A. In this case, the wireless communication topology 310B is formed by associating one or more STA devices to one or more APs based on sensing-based metrics. In some examples, the wireless communication topology may be formed for the purpose of motion localization in the space 301. In this case, the wireless communication topology for performing wireless data communication is identical to a motion sensing topology for performing motion sensing. Controlling the wireless communication topology may result in the devices 332A, 332B, and 332F being associated (e.g., by respective wireless links 344A, 344B, 344F) with AP 328B, while the devices 332C, 332D, and 332E may be associated (e.g., by respective wireless links 344C, 344D, 344E) with AP 328A. In like manner, controlling the wireless communication topology may result in the device 332G being associated (e.g., by wireless link 344G) with AP 326.

Wireless sensing software (e.g., motion detection software), running on the one or more of the devices 332A, 332B, 332C, 332D, 332E, 332F, 332G or on one or more of the APs 326, 328, may collect and process data (e.g., channel information) corresponding to wireless motion sensing links in the motion sensing topology on which motion sensing measurements are performed. The wireless sensing software may be installed as a user application on the devices or on the APs, or may be part of the operating systems on the devices or the APs. The wireless sensing software and the wireless communication network can form a wireless sensing system.

In some implementations, the AP devices 326, 328 do not contain wireless sensing software and are not otherwise configured to perform motion detection in the space 301. Instead, in such implementations, wireless sensing software runs on the STA devices 332A, 332B, 332C, 332D, 332E, 332F, 332G. In some examples, the wireless sensing software running on a STA device may have access to channel information provided by the client device's radio firmware (e.g., WiFi radio firmware) so that channel information may be collected and processed. In some implementations, the client device 332A, 332B, 332C, 332D, 332E, 332F, 332G sends a request to its associated AP 326, 328 to transmit wireless signals that can be used by the client device as motion probes to detect motion of objects in the space 301. The request sent to the associated AP 326, 328 may be a null data packet frame, a beamforming request, a ping, standard data traffic, or a combination thereof.

In some implementations, the results obtained from running the wireless sensing software (e.g., a determination of whether or not motion occurred in the space 301 or a location of motion in the space 301) may be provided in real-time to an end-user. Additionally or alternatively, the results obtained from the wireless sensing software may be stored (e.g., locally on the client devices 332 or the APs 326, 328 or on a cloud-based storage service) and analyzed to reveal, to the end-user, statistical information over a particular time frame (e.g., hours, days, or months). In some implementations, an alert (e.g., notifications, audio, or video alerts) may be provided to the end-user depending on the results obtained from the wireless sensing software. For example, the wireless sensing system may communicate a motion detection event to another device or system, such as a security system or a control center. As another example, the wireless sensing system may communicate a motion detection event to a caregiver or to an emergency contact designated by the end-user.

As an alternative in some case, a motion sensing topology that is distinct from the wireless communication topology is defined for motion detection. For example, the motion sensing topology can be created without modifying the association between any of the STA devices and AP devices in the multi-AP wireless communication network 300. In this case, the wireless communication topology (e.g., 310A in FIG. 3A or 310B in FIG. 3B) is used for network traffic and possibly other wireless network functions, while the distinct motion sensing topology is used for motion sensing functions and potentially other wireless sensing applications. Accordingly, a new wireless link (e.g., a virtual link) in the motion sensing topology can be used exclusively for wireless motion sensing (but not for wireless network traffic or other wireless network functions). In this case, the new wireless link serves as a wireless motion sensing link in the motion sensing topology of the wireless communication network 300, but it is not used in the wireless communication topology of the wireless communication network 300. An example is described with respect to FIGS. 8A, 8B.

FIG. 4 is a flow chart showing aspects of an example process 400 for controlling a motion sensing topology in a wireless communication network. In some implementations, the wireless communication network is a standardized wireless communication network that executes the example process 400 and operates based on a wireless communication standard, examples being Wi-Fi Direct, the IEEE 802.11md standard, and the IEEE 802.11ax standard. The wireless communication network in which the example process 400 is performed includes multiple access point (AP) devices and at least one client station (STA) device. In some implementations, the wireless communication network includes a multi-AP controller (e.g., provided on the central AP 326 in FIGS. 3A-3B). In some examples, the example process 400 may be used to determine, control, modify, or reconfigure the motion sensing topology shown in the example multi-AP wireless communication network of FIGS. 8A-8B.

Figure 4A:
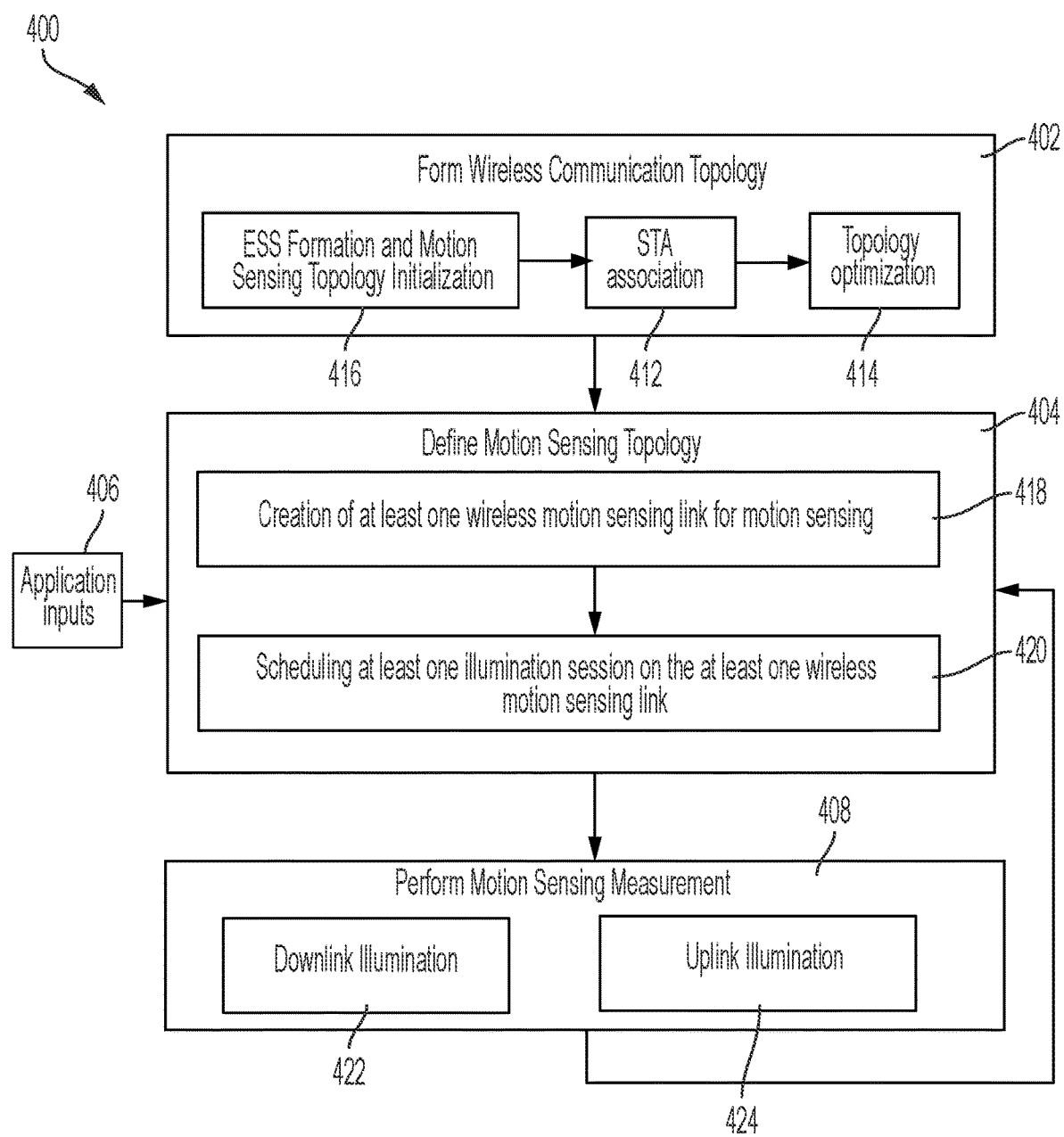
FIG. 4A is a flow chart showing aspects of an example process.

At 402, a wireless communication topology of the multi-AP wireless communication network is formed. As shown in the example process 400, the operation 402 includes a sub-operation 416, in which an ESS is formed and a motion sensing topology is initialized. In some instances, a user can plug in AP devices. As the AP devices boot up, the AP devices may communicate with one another to form the ESS. In some implementations, once the ESS is formed, a wireless communication topology is initialized. In some instances, the initial motion sensing topology is identical to the wireless communication topology (e.g., the initial wireless communication topology obtained during the sub-operation 416). In some implementations, a coordinated list of exchanged parameters between all AP devices within the ESS can be generated by operation of the multi-AP controller. For example, the multi-AP controller receives entries from all the APs to create the complete list. A coordinated list includes names of respective BSSs, operating frequencies of the respective BSSs, a list of all respective STA devices associated with the respective BSSs, indication of which BSSs each associated STA device is within communication range of, and timing information of broadcast downlink illumination transmission for each AP device (e.g., sub-operation 422 in operation 408 as shown in FIGS. 4A and 4E). In some implementations, this list may be updated periodically.

In some implementations, during the motion sensing topology initialization, time windows for respective AP devices in the ESS to transmit respective broadcast illuminations (e.g., when performing downlink illumination broadcast during the operation 408) can be negotiated and determined. In some instances, information of the determined time windows of the respective AP device may be communicated to STA devices, so the STA device knows when to change channels for receiving the downlink illumination broadcast form the respective AP devices.

Figure 9A:
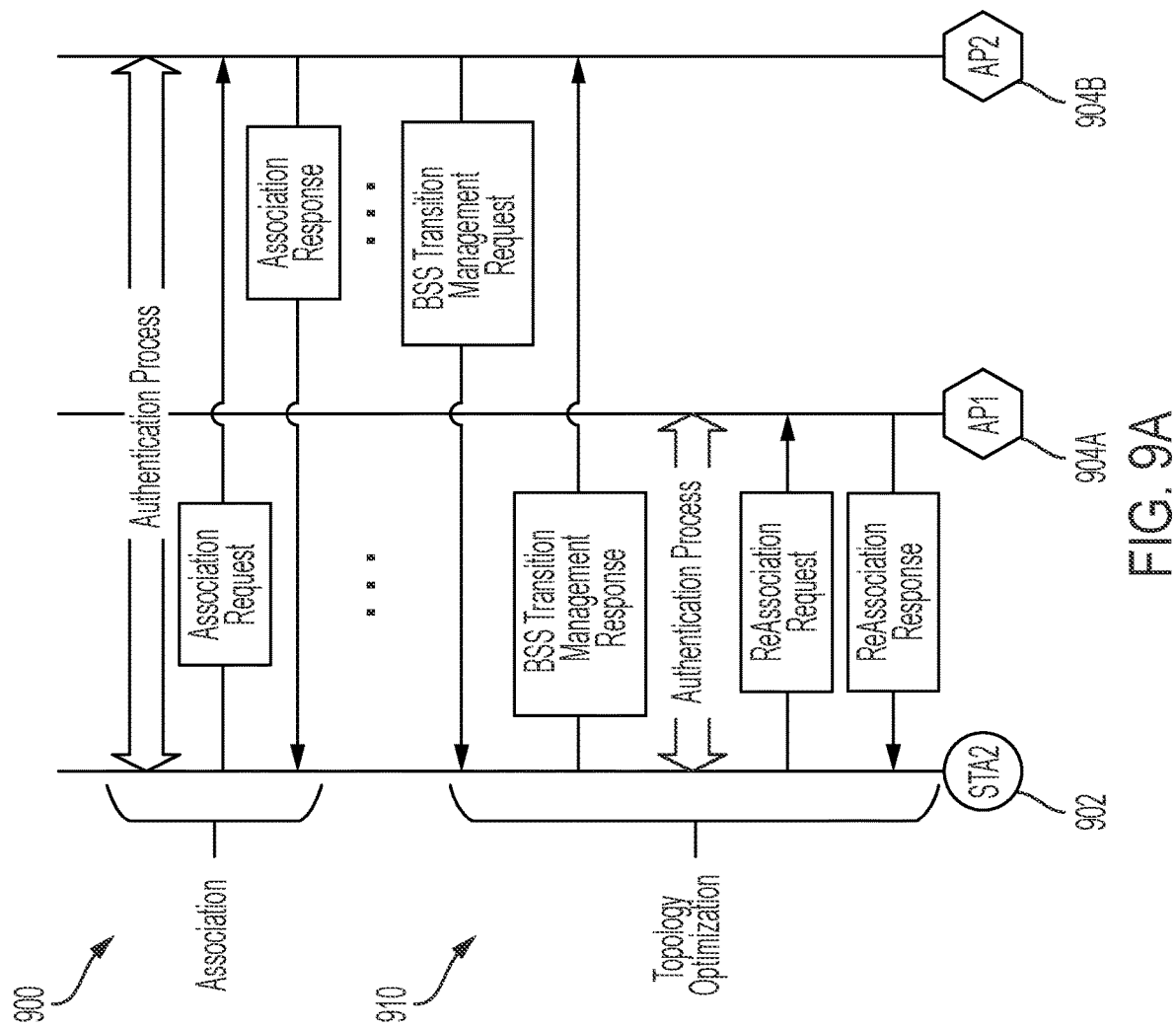
FIG. 9A is a ladder diagram showing aspects of an example association process with respect to the example ESS shown in FIG. 8A and an example topology optimization process with respect to the example ESS shown in FIG. 8B.

As shown in the example process 400, the operation 402 includes a sub-operation 412, in which an association process is performed. Prior to the association process, an STA device might not be associated with any AP device. For example, when an STA device is powered on, the association process 412 can be performed between the STA device and a neighboring AP device. In some implementations, an association process is performed to associate the STA device to an AP device within its proximity. For example, during the sub-operation 412, an STA device may send probe requests to discover the AP devices within its proximity. Probe requests advertise the supported data rates and capabilities of the STA device. All AP devices that receive the probe request can respond. AP devices receiving the probe request check to see if the STA device has at least one common supported data rate. If they have compatible data rates, a probe response is sent advertising the SSID (wireless communication network name), supported data rates, encryption types if required, and other capabilities of the AP device. The STA device then determines compatible networks based on the probe responses it receives from more than one AP device. Once the STA device determines an AP device that the STA device would like to be associated with, the STA device can send an association request to that AP device. If elements in the association request match the capabilities of the AP device, the AP device can create an Association ID for the STA device and respond with an association response with a success message granting network access to the STA device. In this case, the STA device is successfully associated to the AP device and data transfer as part of the wireless data communication may begin on a first wireless link, which is between the STA device and the associated AP device. In some implementations, an authentication process (e.g., the example association process 900 and the example topology optimization process 910 as shown in FIG. 9A) can be performed between the STA device and the AP device prior to sending the association request to the AP device from the STA device.

As shown in the example process 400, the operation 402 further includes a sub-operation 414, in which the wireless communication topology is optimized. Operation 414 may occur periodically and asynchronously. In some implementations, operation 414 is omitted or optional. In certain cases, the topology optimization process 414 may result in a change in the wireless communication topology. For example, an STA device may be de-associated with a first AP device and re-associated with a second AP device. In this case, a first associated wireless link between the STA device and the first AP device can be deactivated; and a second, different associated wireless link between the STA device and the second AP device can be created by steering the STA device from the first AP device to the second AP device. In this case, an indication of a change in the wireless communication topology, particularly in the BSSs where the changes occur can be transmitted to and coordinated by the multi-AP controller. In some implementations, the multi-AP controller initiates the optimization process of the wireless communication topology. In some instances, a change in the wireless communication topology of the wireless communication network may include one or more of the following situations, for example, a new STA device joining the wireless communication work, a modification due to an optional optimization performed by the multi-AP controller, or another situation. In certain instances, once the wireless communication topology is optimized and an optimized wireless communication topology is formed, the motion sensing topology is updated to be identical to the optimized wireless communication topology. In certain instances, the motion sensing topology remains as the initial wireless communication topology.

At 404, the motion sensing topology is defined. In some cases, the motion sensing topology is initialized to be identical to the wireless communication topology (e.g., during the sub-operation 416), and the motion sensing topology is then updated, while the wireless communication topology remains unchanged. For example, an STA device may be associated with a first AP device defining a first BSS through an associated wireless link for wireless data communication. In this case, when the operation 404 is performed, a wireless motion sensing link between the STA device and a second, different AP device defining a second BSS can be formed. The STA device, in this case, is not associated with the second AP device and remains associated with the first AP device. In some cases, a series of motion sensing measurements can be scheduled on the wireless motion sensing link, and the series of motion sensing measurement is then performed according to the schedule. In certain instances, when a motion sensing measurement is performed on the wireless motion sensing link, the wireless data transmitted on the wireless link between the STA device and the first AP can be paused, and data can be buffered in the first AP device or the STA device for later transmission, for example, when the scheduled motion sensing measurement is completed, and the STA device returns from "a motion sensing mode" to "a wireless data communication mode".

As shown in the example process 400, the operation 404 receives inputs from the operations 402. For example, a list of which STA devices are associated, and which STA devices are within communication range of all available AP devices can be generated during the sub-operations 414 and 416 in the operation 402. For another example, when the BSSs within the ESS operate at different communication frequencies and when the downlink illumination process is used for performing the motion sensing measurement, timing information when each AP will broadcast a downlink illumination so the STA device will know when to tune to the frequency to receive the broadcast illumination can be generated during the sub-operation 416.

As shown in FIG. 4A, the operation 404 receives additional application instructions or constraints from application inputs 406. Such instructions are used during the operation 404, for example by operation of the multi-AP controller, in scheduling illumination sessions within the ESS. In some instances, an instruction explicitly defining a motion sensing topology can be received from the application inputs 406. For example, the application inputs 406 can provide information such as on which AP/STA pairs motion sensing measurement are to be performed, and whether uplink or downlink illumination is required, whether the measurements are desired in the uplink direction, downlink direction, or both, the rate of which uplink measurements are to be performed, or whether a single or periodic illumination is desired. In some instances, the application inputs 406 may specify constraints which can be used to determine which STA device and which AP device will be used to form a wireless motion sensing link to improve motion detection, which type of illumination (e.g., downlink or uplink illumination) will be used on this wireless motion sensing link. For example, a constraint that can be included as part of the application inputs 406 may be maximizing floor coverage, maximizing coverage in certain areas, or minimizing coverage in certain areas. In this case, updates to the motion sensing topology may be determined by operation of the multi-AP controller after receiving constraints in the application inputs 406.

As shown in FIG. 4A, the operation 404 can also receive inputs from a motion sensing measurement 408. In some implementations, the operation 408 can transmit an indication that the measurements (e.g., a single measurement or a sequence of N periodic measurements) is completed. In some instances, when this indication is received by the operation 404 from the operation 408, based on the application inputs 406, new measurements can be scheduled. In certain instances, when this indication is received by the operation 404 from the operation 408, based on the application inputs 406, a change in the motion sensing topology may take place.

In some instances, creation of the at least one motion sensing link for motion sensing may also be determined based on device-level inputs, e.g., battery life, resources, or other device-level parameters. For example, when battery life of an STA device is below a threshold limit, the motion sensing links between the STA device and respective AP devices might not be used for motion sensing.

As shown in the example process 400, the operation 404 includes a sub-operation 418, in which at least one wireless motion sensing link can be created for motion sensing. In some implementations, a wireless motion sensing link can be created as part of the motion sensing topology. The wireless motion sensing link can be created between an STA device and an AP device that is in the communication range of the STA device but not associated with the STA device.

As shown in the example process 400, the operation 404 further includes a sub-operation 420, in which at least one illumination session is scheduled on the at least one wireless motion sensing link. In some instances, the operation 420 can be used to coordinate motion sensing processes performed in the wireless communication network with respect to the motion sensing topology. The operation 418 is used to coordinate measurements in the uplink and downlink directions between the STA devices and AP devices within the ESS. As shown in FIG. 4A, the operation 420 is performed based on the information of the wireless communication topology obtained from the operation 402, the information of the motion sensing topology obtained during the operation 418, and instructions/constraints from the application inputs 406. In some instances, the motion sensing topology also includes wireless links, each of which are between two associated AP device and STA device. In this case, illumination sessions are also scheduled on these wireless links.

In certain instances, multiple wireless motion sensing links on which motion sensing measurements can be formed between a single STA device and multiple respective AP devices in proximity to the STA device. The STA device may operate at different frequencies when communicating with the multiple respective AP devices during respective scheduled illumination sessions. Similarly, multiple wireless motion sensing links on which motion sensing measurements can be performed can be also formed between a single AP device and multiple respective STA devices. In this case, the AP device may operate on the same channel when communicating with the multiple respective STA devices during respective scheduled illumination sessions.

At 408, a motion sensing measurement is performed. The motion sensing measurement can be initialized by the multi-AP controller and can be performed by the respective AP devices and STA devices according to the motion sensing topology and the scheduled illumination sessions. In some implementations, a motion sensing measurement can be performed on the at least one wireless motion sensing link formed during the operation 404. In some implementations, the operation 408 includes one or more downlink illumination processes on one or more wireless motion sensing links, and/or one or more uplink illumination processes on one or more wireless motion sensing links.

As shown in the example process 400, the operation 408 includes a sub-operation 422, in which a downlink illumination process is performed on a wireless motion sensing link. In the example operation 422, the STA device listens to broadcast illumination transmission from an AP device on a wireless motion sensing link at a pre-scheduled time, determines channel state information, and computes channel estimation for motion sensing purposes. In some examples, when the STA device performs a wireless data communication with a first associated AP device on a first frequency, the STA device, at the scheduled downlink illumination session, may need to switch to a second, different frequency on which a second AP device operates to receive the downlink illumination transmitted on the wireless motion sensing link from the second AP device. In certain examples, when the first and second AP devices operate on the same frequency, the STA device may not be required to switch to a different frequency to receive the downlink illumination from the second AP device. In some implementations, the wireless data communication between the STA device and the first associated AP device can be temporarily paused on the associated wireless link. In this case, data can be buffered on either the first AP device or the STA device, and resumed until the STA device returns from the "motion sensing mode" with the second AP device to the "wireless data communication mode" with the first AP device.

Figure 4B:
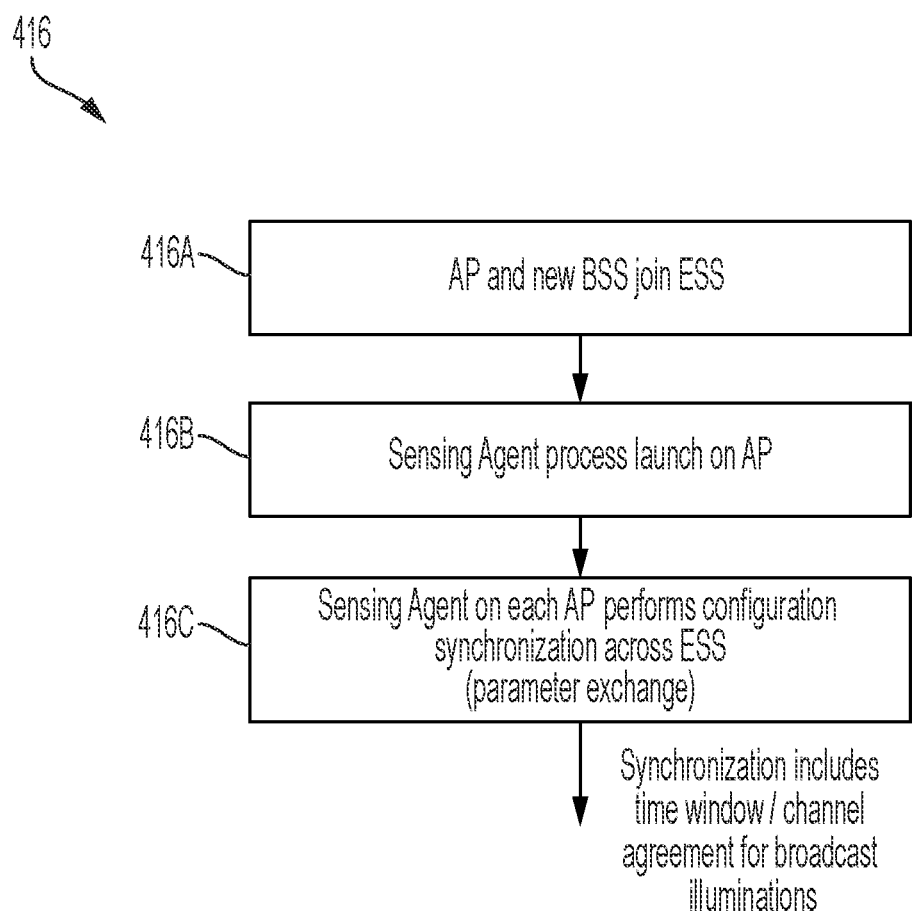
FIG. 4B is a flow chart showing aspects of an example initialization process of a wireless communication network for motion sensing.
Figure 4C:
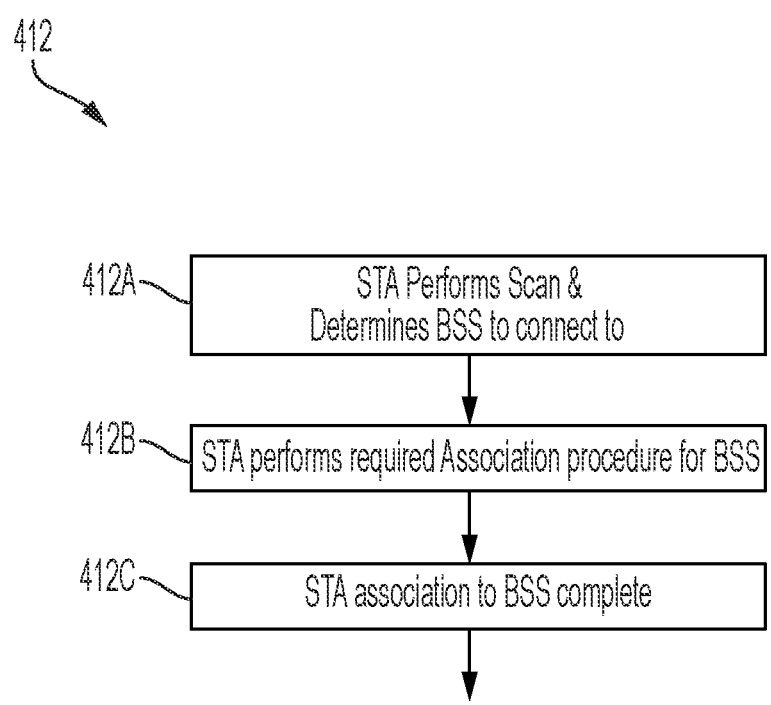
FIG. 4C is a flow chart showing aspects of an example association process.
Figure 4D:
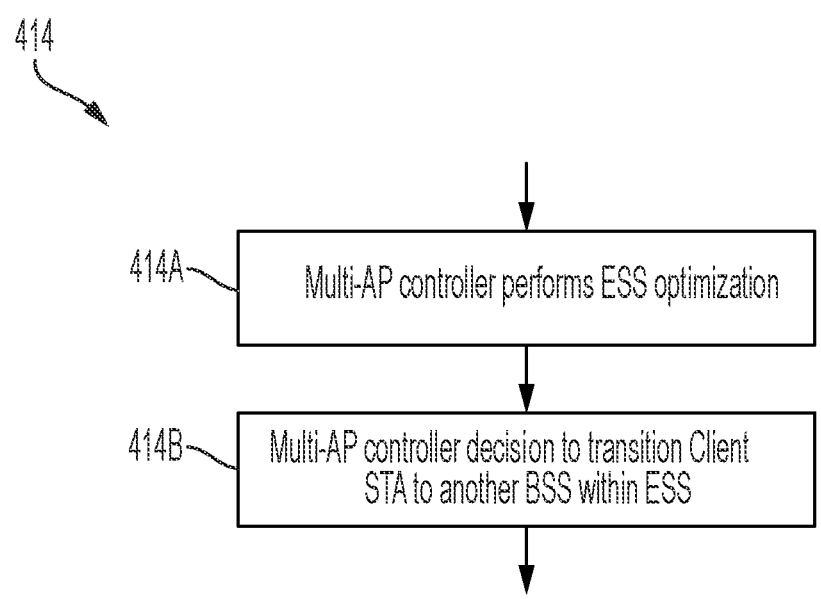
FIG. 4D is a flow chart showing aspects of an example topology optimization process.
Figure 4E:
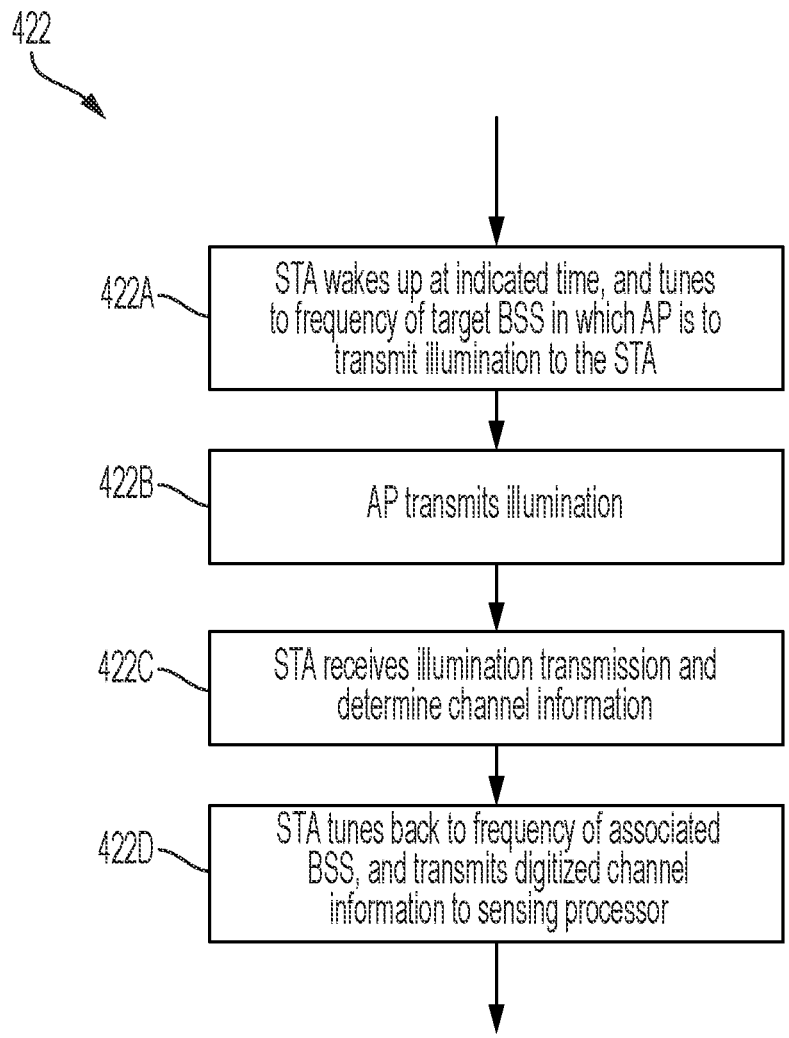
FIG. 4E is a flow chart showing aspects of an example motion sensing measurement process.
Figure 4F:
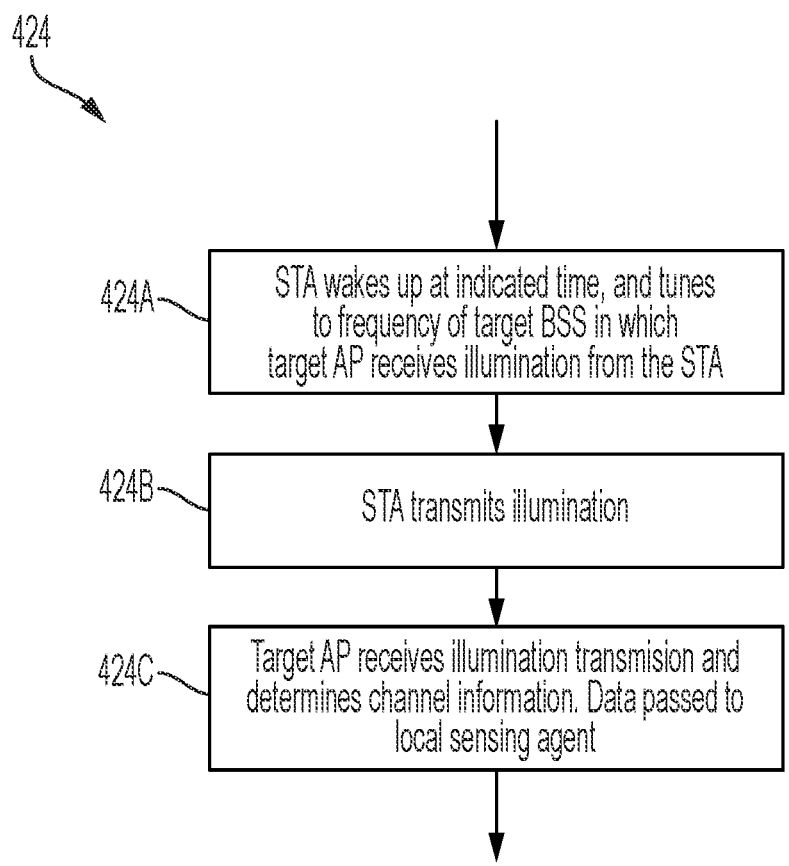
FIG. 4F is a flow chart showing aspects of an example motion sensing measurement process.

In such implementations, the wireless communication standard used may provide a STA device the ability to sound an AP device in the ESS that the STA device is not currently associated with (e.g., uplink illumination process 424 as shown in FIGS. 4A and 4F). Consequently, by allowing the STA device the ability to sound an AP device in the ESS which it is not currently associated with, while maintaining its association to another AP device for communication purposes. In this case, the motion sensing topology, which is different from the wireless communication topology, is formed within the wireless communication network. In some implementations, the motion sensing topology and the wireless communication topology can operate independently, together, or otherwise in a controlled manner, allowing for optimized performance in wireless data communication and motion sensing. In some implementations, the motion sensing topology includes at least one wireless motion sensing link that is not a wireless link of the wireless communication topology.

As shown in the example process 400, the operation 408 includes a sub-operation 424, in which an uplink illumination process is performed on a wireless motion sensing link. Operation 424 can be executed in addition to, or as an alternative to, operation 422. In some implementations, the operation 424 may be a higher-layer (e.g., application-based) criteria (e.g., localization) selection for determining a motion sensing topology. In some implementations, operation 424 may be an automatic optimization that may use time-of-flight (e.g., round trip time) measurements between all devices (e.g., STA devices and AP devices) to construct a 3D map of device locations. In some implementations, input may be provided by an end-user as to physical location of devices.

In the process 400, the wireless communication standard used may allow any AP device in a multi-AP wireless communication network ESS to elicit a channel illumination transmission from any STA device within communication range. Furthermore, the wireless communication standard used may provide one or more of the following: STA devices the ability to send illumination to non-associated AP device (e.g., AP devices within ESS); AP devices the ability to request or elicit non-associated STA devices to transmit channel illumination; and AP devices the ability to synchronize and listen to non-associated STA device (broadcast) transmissions.

In some implementations, each AP device in the motion sensing topology includes a sensing agent. For instance, a sensing processor can be deployed on any AP device, on a separate device, or in another manner. In some implementations, a sensing agent is software that can be installed on an AP device or a STA device. A sensing agent is configured for performing sensing related operations outside normal Wi-Fi defined behaviors. For example, when the sensing agent is integrated on an AP device, the sensing agent can facilitate downlink broadcast transmission during a determined time window. For another example, the sensing agent on an AP device can facilitate the extraction of channel information from received uplink transmission from a STA device. For example, a sensing agent can be also integrated on a STA device, a sensing agent can facilitate switching channel during a determined time window to perform uplink transmission. For another example, a sensing agent on a STA device can facilitate reception downlink broadcast transmission from an AP device and extraction of channel information from the received downlink broadcast transmission. In some implementations, a sensing processor is a device which contains a motion sensing algorithm and is configured for processing the channel information data to extract motion sensing outputs. In some instances, an EES may include one or more sensing processors. In certain examples, a sensing processor may be located on a device (e.g., an AP device, or a device located on a cloud), where the channel information is measured, or it may be located on a different device (e.g., a dedicated device with more computational power).

In some aspects of what is described here, when the motion sensing measurement is performed, a set of observed channel responses are obtained based on a set of wireless signals transmitted through a space (or propagation environment). Each of the wireless signals in the set of wireless signals that is transmitted in the environment may be an orthogonal frequency division multiplexing (OFDM) signal, which can include, for example, a PHY frame. The PHY frame can, in some instances, include one or more Legacy PHY fields, one or more MIMO training fields, or both. Example Legacy PHY fields include a Legacy Long Training Field (L-LTF), a Legacy Short Training Field (L-STF), and other types of Legacy PHY fields. Example MIMO training fields include a High Efficiency Long Training Field (HE-LTF), a Very High-Throughput Long Training Field (VHT-LTF), a High-Throughput Long Training Field (HT-LTF), and other types of MIMO training fields. The fields in the PHY frames of the wireless signals in the set of wireless signals can be used to obtain the set of observed channel responses. In some instances, the set of observed channel response includes frequency-domain channel responses, and each frequency-domain channel response in the set of frequency-domain channel responses may correspond to a respective wireless signal in the set of wireless signals. Motion of an object in the space can cause a change in one or more of the frequency-domain channel responses, and changes observed in the set of frequency-domain channel responses can be used to detect motion of an object within the space.

In some implementations, during operation 408, the channel information (e.g., CSI) for each of the communication links including associated wireless links and/or at least one wireless motion sensing link may be transmitted to and analyzed by one or more motion detection algorithms running on a sensing processor to detect, for example, whether motion has occurred in the space, to determine a relative location of the detected motion, or both. A sensing processor may be included in a hub device, a client device (e.g., an STA device), or other device in the wireless communication network, or on a remote device. In some aspects, the channel information for each of the communication links may be analyzed to detect whether an object is present or absent, e.g., when no motion is detected in the space.

In some implementations, the sensing processor can output motion data based on the measured channel information. In certain instances, the measured channel information can be received by the sensing processor from an STA device after receiving a downlink illumination transmission from an AP device on a wireless motion sensing link (e.g., as described in FIG. 9B). In some instances, the measured channel information can be received by the sensing processor from an AP device after receiving an uplink illumination transmission from an STA device on a wireless motion sensing link (e.g., as described in FIG. 9C). In some implementations, motion data is a result that is indicative of a degree of motion in the space, the location of motion in the space, a time at which the motion occurred, or a combination thereof. In some instances, the motion data can include a motion score, which may include, or may be, one or more of the following: a scalar quantity indicative of a level of signal perturbation in the environment accessed by the wireless signals; an indication of whether there is motion; an indication of whether there is an object present; or an indication or classification of a gesture performed in the environment accessed by the wireless signals.

FIG. 4B is a flow chart showing aspects of an example motion sensing topology initialization process 416. As shown in FIG. 4B, the example process 416 includes: operation 416A where an AP device and a new BSS joins the ESS; operation 416B where the sensing agent process (e.g., which controls the motion sensing topology) launches on the AP device; and operation 416C where the sensing agent on each AP device performs configuration synchronization across the ESS (which can result in parameter exchange among the AP devices). In some implementations, synchronization may include time window and/or channel agreements for broadcast illuminations.

FIG. 4C is a flow chart showing aspects of an example association process 412 in FIG. 4A. As shown in FIG. 4C, the example association process 412 includes: operation 412A in which the STA device performs a scan and determines the base service set (BSS) to connect to; operation 412B in which the STA device performs an association procedure; and operation 412C in which the association of the STA device to BSS is complete.

FIG. 4D is a flow chart showing aspects of an example topology optimization process 414 in FIG. 4A. As shown in FIG. 4D, the example topology optimization process 414 includes operation 414A where the multi-AP controller of the multi-AP wireless communication network performs ESS optimization processes (e.g., to determine the wireless communication topology); and operation 414B where the multi-AP controller determines another BSS within the ESS where the STA device will be transitioned to. In some instances, a new association process (e.g., the example association process 412 shown in FIG. 4C) can be performed between the STA device and the AP device defining the BSS where the STA device will be transitioned to.

FIG. 4E is a flow chart showing aspects of an example motion sensing measurement process 422. In some Instances, an STA device may be associated to a first AP device operating at a first operating frequency which is different from a second operating frequency of a second AP device which transmits the broadcast illumination for motion sensing. In some implementations, an illumination session is performed between the STA device and the second AP device of a target BSS, during which the STA device receives a broadcast illumination transmitted by the second AP and the channel information of the wireless motion sensing link between the STA device and the second AP device can be determined. In certain instances, the illumination sessions are performed on the communication links (e.g., associated wireless links and at least one wireless motion sensing link) within the motion sensing topology.

At 422A, the STA device wakes up at an indicated time and tunes its frequency to the second operating frequency of the target BSS in which the second AP device is to transmit a broadcast illumination. In some implementations, the second operating frequency may be determined during the operation 408. Knowledge of the second operating frequency and timing intervals are made available to the STA device during the operation 418. In this case, it is possible that multiple STA devices may receive the same broadcast illumination transmitted by the second AP device at the same time. In this case, all the STA devices within the range of the second AP device will be tuned to the second operating frequency to receive the broadcast illumination transmitted by the second AP device. In some instances, prior to the scheduled illumination sessions, the STA devices that receive the broadcast illumination transmitted by the second AP device may already operate on the second operating frequency.

At 422B, the second AP device transmits broadcast illumination. In some implementation, at the highest layer, this broadcast transmission contains a digital payload that can be used to identify the transmission to a receiver (e.g., a STA device) and indicate it is the desired broadcast illumination. The digital payload of this broadcast transmission may follow the defined 802.11 MAC format, and may take on the form of an already defined message type/subtype (such as a control, management, or data message), or may take the form of a newly defined message making use of reserved type/subtype bits. In some instances, the 802.11 MAC format contains the MAC address of the AP device identifying the transmitter (e.g., the AP device). At the PHY layer, this message may be encapsulated in one of multiple PHY frame types. For example, the broadcast transmission may be part of a Legacy PHY frame, an HT PHY frame, a VHT PHY frame, or an HE PHY frame. In some instances, the selection may depend on which devices are intending to receive the message. For example, an HT PHY is not able to receive a VHT transmission. In some instances, multiple generation PHYs can be included to receive the broadcast transmission. In this case, a commonly supported PHY frame format can be used, or the broadcast transmission may include multiple transmissions of different PHY frame formats. At a minimum, the illumination transmission will contain a preamble of which a channel estimation can be computed (e.g., L-LTF, HT-LTF, VHT-LTF, HE-LTF).

At 422C, the broadcast illumination is then received by the STA device and channel measurement is performed. For example, knowledge of the PHY transmission used to determine the channel information will be obtained. In some implementations, the channel information of the wireless motion sensing link between the STA device and the second AP device is determined by the STA device.

At 422D, the determined channel information is transmitted by the STA device to the sensing processor for processing. In some instances, the STA device may return back to the first operating frequency of the first AP device it is associated with, and transmit a digitized version of the determined channel information to the sensing processor through the first AP device on the associated wireless link. In some instances, when the broadcast transmission (or specifically the L-LTF/HT-LTF/VHT-LTF/HE-LTF waveform) is received, RF signals associated with the broadcast transmission is down-converted and digitized by the STA device. For example, this step may involve operations, including directly placing the raw output from the STA device, quantizing the raw output to a specific bit resolution, performing compression (lossy or loss-less) to improve efficiency, or performing a digital signal processing operation such as filtering or interpolation.

In the case of the downlink illumination, since the illumination transmissions are broadcast by the second AP device, the period between transmissions is determined during the operation 416. The rate is dependent on the sensing application executing on the wireless communication network, e.g., for a motion detection application, the rate may be determined to be 100 ms. This means it is not possible to have different illumination rates in the downlink direction between an AP device and multiple STA devices. In some implementations, different STA devices with a range of the second AP device can receive different subsets of broadcast illuminations from the second AP device. For example, a first STA device, e.g., STA1, receives every first illumination, but STA2 receives every second illumination). In some implementations, a STA device may be configured to receive broadcast transmissions from different AP devices that the STA device is not associated with at during different time windows. In other words, a single STA device may be used in multiple, distinct motion sensing links for performing motion sensing measurement during different time windows.

In some instances, during downlink illumination, an AP device can transmit a beacon which can be received by STA devices within its range. In some instances, a beacon is transmitted by the AP device periodically, for example, for the purpose of advertising the BSS and capabilities. In some implementations, this transmission may serve as the illumination identified during operation 420.

FIG. 4F is a flow chart showing aspects of an example motion sensing measurement process 424 as shown in FIG. 4A. In some cases, an STA device is associated to a first AP device through an associated wireless link at a first operating frequency. The example process 424 is an uplink illumination process, during which the STA device transmits an uplink illumination to a second AP device on a wireless motion sensing link at a second operating frequency. Knowledge of the second operating frequency and timing intervals will be made available during the operation 418 in FIG. 4A.

At 424A, the STA device tunes, for example, from the first operating frequency, to the second operating frequency of which the second AP device is operating on.

At 424B, the illumination transmission is performed by the STA device to the second AP device. In some instances, the illumination transmission contains a preamble of which a channel estimation can be computed (L-LTF, HT-LTF, VHT-LTF, HE-LTF, EHT-LTF). In some implementations, the illumination transmission may be preceded by an illumination announcement message which informs the second AP device that within a specific time interval following, the illumination will be transmitted. The illumination announcement message may contain the STA device identifier or session identifier of which the following illumination belongs to. In other examples, the illumination transmission may contain the preamble of which a channel estimation can be computed along with the STA device or session identifier.

At 424C, the illumination is received from the STA device by the second AP device. When the illumination announcement message is received by the second AP device, knowledge of the STA device may be obtained. The channel information of the wireless motion sensing link is computed by the second AP device. In some implementations, channel information is determined from the L-LTF, HT-LTF, VHT-LTF, HE-LTF. The LTF is a defined waveform which is transmitted. The received version of the waveform is compared to the ideal or expected waveform, and therefore transformation from the ideal to what was received must be due to the channel.

Figure 5:
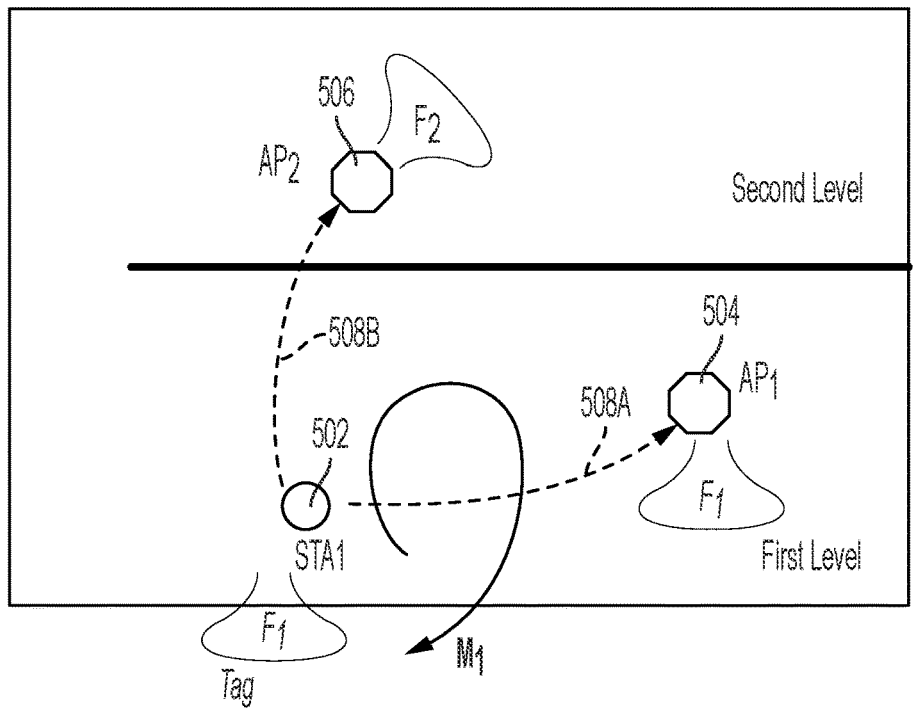
FIG. 5 is a block diagram showing aspects of an example wireless communication network on which a control of a motion sensing topology is performed.

FIG. 5 is a block diagram showing aspects of an example wireless communication network 500 on which a control of a motion sensing topology is performed. In the example of FIG. 5, the space includes a first level and a second level. An STA device 502 and a first AP device 504 are located on the first level, while a second AP device 506 is located on the second level. A user may assign a label "F1" to the STA device 502 and the first AP device 504, thus associating the STA device 502 with the first AP device 504 (e.g. via a wireless link 508A) for motion detection. The user may assign another label "F2" to the second AP device 506, which is different from the label assigned to the STA device 502. Consequently, although the STA device 502 may be associated with the second AP device 506 in a wireless communication topology (e.g., via a wireless link 508B), the STA device 502 forms a motion sensing link with the first AP device 504 in a motion sensing topology. Consequently, motion M1 on the wireless link 508A may be detected. Therefore, in the example of FIG. 5, labels assigned to the levels, AP devices, and STA devices may be used to make sounding decisions for motion sensing, whatever the underlying network or wireless communication topology may be.

Figure 6:
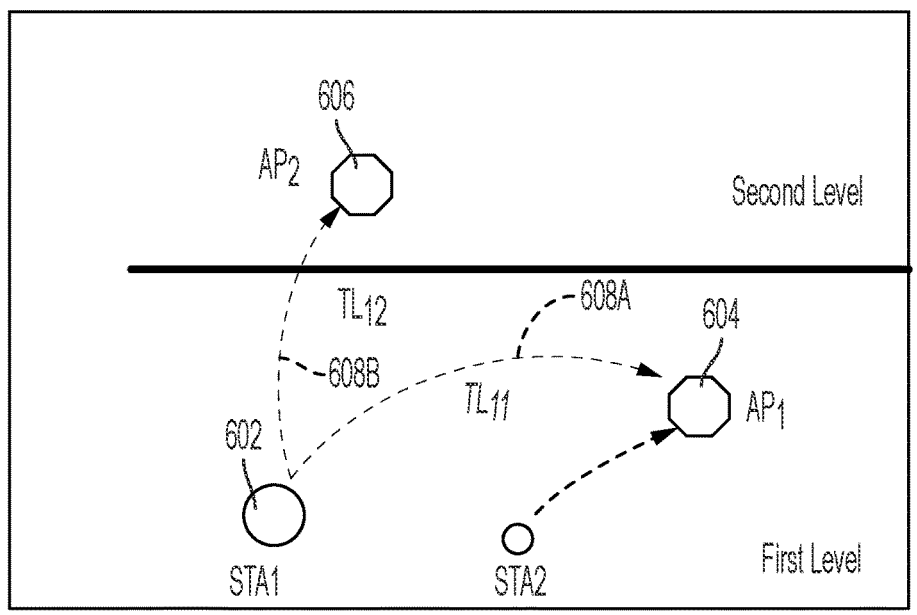
FIG. 6 is a block diagram showing aspects of an example wireless communication network in which a motion sensing topology is controlled.

FIG. 6 is a block diagram showing aspects of an example wireless communication network 600 in which a motion sensing topology is controlled. In the example shown, all the available communication links between the STA device and all AP devices within the ESS (e.g., links having relatively high received signal strength indicators (RSSI)) are illuminated or measured in some coordinated fashion (e.g., sequentially or randomly). In some examples, with sequential measurements, each communication link can be measured sequentially in a round-robin fashion, in the Uplink and/or Downlink direction(s). In some examples, in random measurements, each communication link has an equal probability of being measured in the Uplink and/or Downlink direction(s) at any time. As a result of the channel measurements of all wireless links available to the STA device, a time series for each individual link is generated. As an illustration, in the example of FIG. 6, the wireless link 608A is available to the STA device 602 to associate with AP device 604. Similarly, the wireless link 608B is available to the STA device 602 to associate with the AP device 606. The wireless links 608A, 608B are illuminated, thus yielding respective time series for each of the wireless links 608A, 608B. As mentioned above, the times at which the wireless links 608A, 608B are sounded may be randomized. The time series for the respective wireless links 608A, 608B can then be correlated with a global motion time series to determine the motion topology. As an example, since the wireless link 608A has a substantially horizontal footprint and the wireless link 608B has a substantially vertical footprint, the wireless link 608A may be more suitable (e.g., have greater sensitivity) for motion compared to the wireless link 608B. Supposing the global motion time series is depicted as time series M(n). In some implementations, M(n) represents the time series of motion detected anywhere in the space using the entire set of wireless links. In some examples, M(n) is a signal having values taken from the set of 0 and 1, where a value 0 indicates no motion being detected along all the wireless links at the respective time point, and a value 1 indicates motion being along at least one wireless link at the respective time point. Furthermore, supposing that $M_{TL11}(n)$ represents the time series generated from sounding the wireless link 608A, and $M_{TL12}(n)$ represents the time series generated from sounding the wireless link 608B. Then, a comparison of the correlation of the global time series M(n) with the time series $M_{TL11}(n)$ and the correlation of the global time series M(n) with the time series $M_{TL12}(n)$ (e.g., over several hours or days) can indicate which of the AP devices 604, 606 are to be used with the STA device 602 in forming the motion sensing topology.

In some examples, the correlation of the global time series M(n) with the time series $M_{TL11}(n)$ can be expressed as $$r_{11} = \sum_{n=1}^{N} M(n)M_{TL11}(n),$$

while the correlation of the global time series M(n) with the time series $M_{TL12}(n)$ can be expressed as $$r_{12} = \sum_{n=1}^{N} M(n)M_{TL12}(n).$$

Generalizing this to i STA devices, j AP devices, and a general time window, the correlation of the global time series M(n) with the time series from the communication link between the $i^{th}$ STA device and the $j^{th}$ AP device can be expressed as:

$$r_{ij} = \sum_{time\ window} M(n)M_{TLij}(n)$$

The correlation $r_{ij}$ can be considered an inverse measure of a distance $d_{ij}$ between the STA device and the AP device. Therefore, $$d_{ij} \propto \frac{1}{r_{ij}},$$

and a higher correlation may be indicative of a smaller distance between the STA device and the AP device. In some implementations, the distance may refer to the distance measured in terms of the number of floors between the STA device and the AP device. In such implementations, devices located on the same floor have a "zero" distance between them, while devices located one floor apart may have a "one" distance between them. In some implementations, controlling the motion sensing topology may include optimizing the motion sensing topology to reduce the distances $d_{ij}$ between the STA devices and the AP devices, subject to the constraint that each STA device is connected to only one AP device for motion sensing topology or sounding. This optimization may be expressed as:

$$\operatorname*{argmin}_{c} \sum_{j} \sum_{i} c_{ij} d_{ij}, \text{ such that } \sum_{j} c_{ij} = 1$$

In the examples discussed above, localization may be performed using client to client sounding and all AP devices to all AP devices sounding. Furthermore, optimizing the motion sensing topology of the communication links between STA devices and the AP devices can occur for Wi-Fi motion sensing in a multi-AP configuration. In some implementations, the wireless communication topology can be optimized in addition to optimizing the motion sensing topology. In some implementations, maximum transit power may be requested for wireless (e.g., Wi-Fi) motion sensing.

The examples described above may be configured to operate based on a wireless communication standard, examples being Wi-Fi Direct, the IEEE 802.11md standard, the IEEE 802.11az standard, the IEEE 802.11ax standard, and the IEEE 802.11be standard. In some implementations, use of the IEEE 802.11az standard may allow non-associated STA devices to request a round-trip time (RTT) measurement (which is a similar protocol to sounding). Consequently, the IEEE 802.11az standard may be used in time-of-flight positioning. In some implementations, the IEEE 802.11md standard may describe a first generation version of RTT, while the IEEE 802.11az standard may describe a second generation version of RTT. Consequently, the IEEE 802.11az standard may contain some features that could be extended for sensing. In some implementations, use of the IEEE 802.11ax standard (Wi-Fi 6) may allow use of a High-Efficiency PHY (HE-PHY) frame in sensing applications. In some implementations, use of the IEEE 802.11be standard (Wi-Fi 7) may allow use of an Extremely High Throughput PHY (EHT-PHY) frame in sensing applications.

Figure 7:
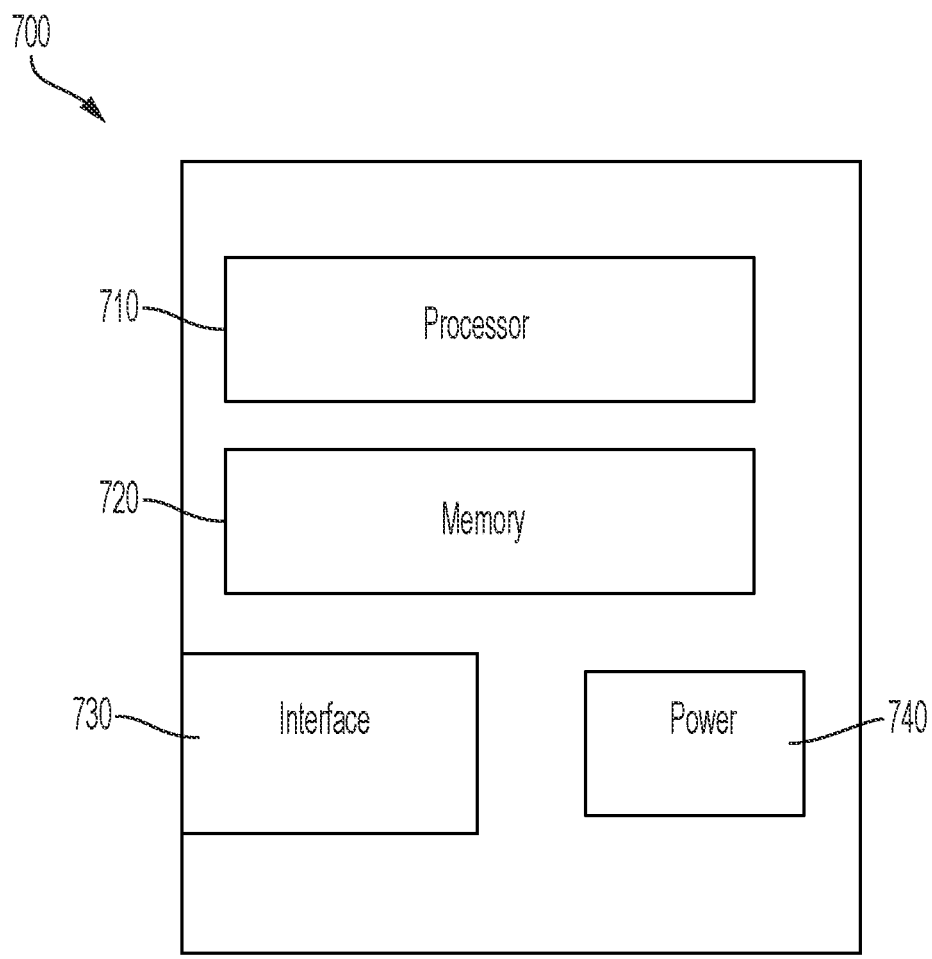
FIG. 7 is a block diagram showing aspects of an example wireless communication device.

FIG. 7 is a block diagram showing an example wireless communication device 700. As shown in FIG. 7, the example wireless communication device 700 includes an interface 730, a processor 710, a memory 720, and a power unit 740. A wireless communication device (e.g., any of the wireless communication devices 102A, 102B, 102C in FIG. 1) may include additional or different components, and the wireless communication device 700 may be configured to operate as described with respect to the examples above or in another manner. In some implementations, the interface 730, processor 710, memory 720, and power unit 740 of a wireless communication device are housed together in a common housing or other assembly. In some implementations, one or more of the components of a wireless communication device can be housed separately, for example, in a separate housing or other assembly.

The example interface 730 can communicate (receive, transmit, or both) wireless signals. For example, the interface 730 may be configured to communicate radio frequency (RF) signals formatted according to a wireless communication standard (e.g., Wi-Fi, 4G, 5G, Bluetooth, etc.). In some implementations, the example interface 730 includes a radio subsystem and a baseband subsystem. The radio subsystem may include, for example, one or more antennas and radio frequency circuitry. The radio subsystem can be configured to communicate radio frequency wireless signals on the wireless communication channels. As an example, the radio subsystem may include a radio chip, an RF front end, and one or more antennas. The baseband subsystem may include, for example, digital electronics configured to process digital baseband data. In some cases, the baseband subsystem may include a digital signal processor (DSP) device or another type of processor device. In some cases, the baseband system includes digital processing logic to operate the radio subsystem, to communicate wireless communication network traffic through the radio subsystem or to perform other types of processes.

The example processor 710 can execute instructions, for example, to generate output data based on data inputs. The instructions can include programs, codes, scripts, modules, or other types of data stored in memory 720. Additionally or alternatively, the instructions can be encoded as pre-programmed or re-programmable logic circuits, logic gates, or other types of hardware or firmware components or modules. The processor 710 may be or include a general-purpose microprocessor, as a specialized co-processor or another type of data processing apparatus. In some cases, the processor 710 performs high level operation of the wireless communication device 700. For example, the processor 710 may be configured to execute or interpret software, scripts, programs, functions, executables, or other instructions stored in the memory 720. In some implementations, the processor 710 may be included in the interface 730 or another component of the wireless communication device 700.

The example memory 720 may include computer-readable storage media, for example, a volatile memory device, a non-volatile memory device, or both. The memory 720 may include one or more read-only memory devices, random-access memory devices, buffer memory devices, or a combination of these and other types of memory devices. In some instances, one or more components of the memory can be integrated or otherwise associated with another component of the wireless communication device 700. The memory 720 may store instructions that are executable by the processor 710. For example, the instructions may include instructions to perform one or more of the operations described above.

The example power unit 740 provides power to the other components of the wireless communication device 700. For example, the other components may operate based on electrical power provided by the power unit 740 through a voltage bus or other connection. In some implementations, the power unit 740 includes a battery or a battery system, for example, a rechargeable battery. In some implementations, the power unit 740 includes an adapter (e.g., an AC adapter) that receives an external power signal (from an external source) and converts the external power signal to an internal power signal conditioned for a component of the wireless communication device 700. The power unit 720 may include other components or operate in another manner.

Figure 8A:
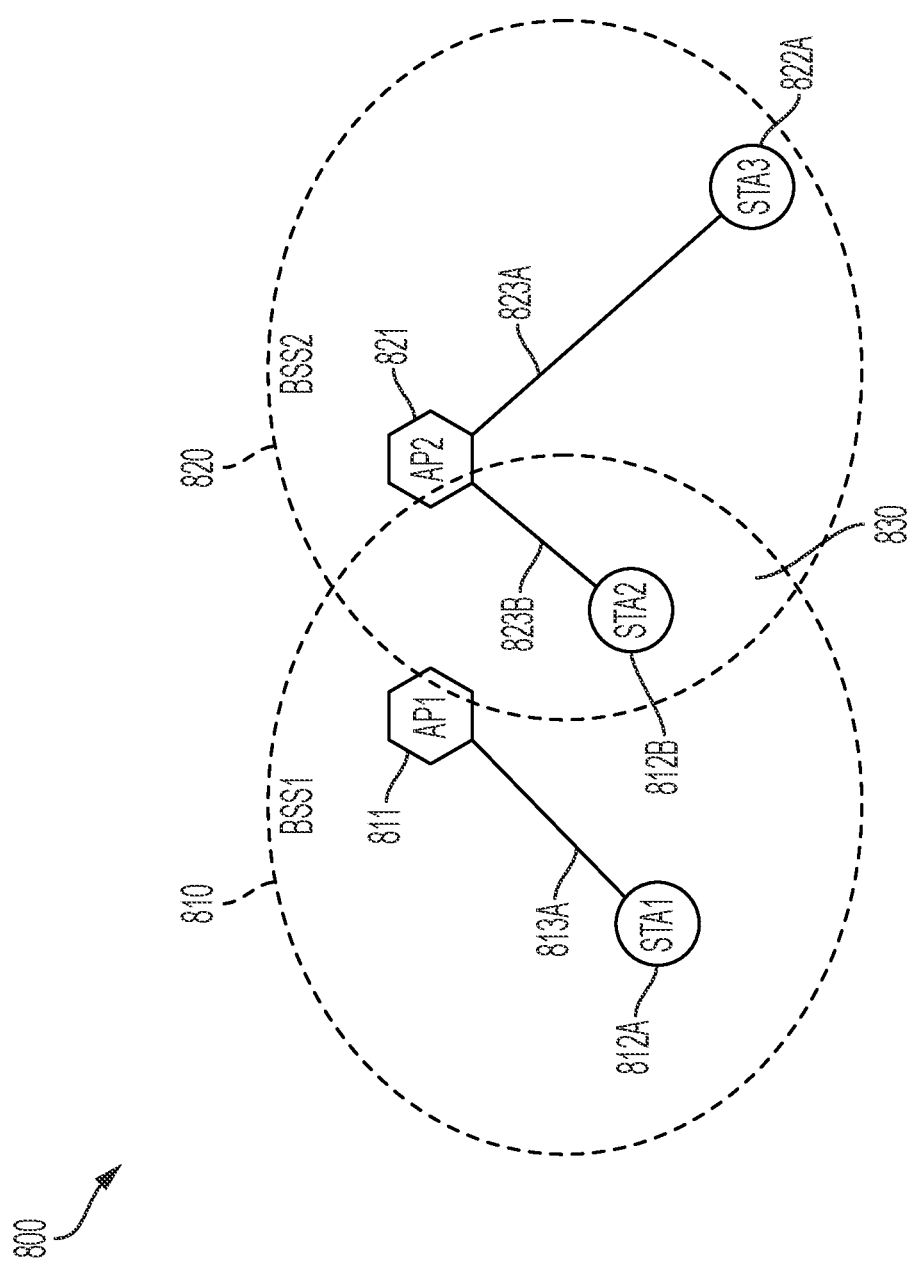
FIG. 8A is a block diagram showing aspects of an example enhanced service set (ESS).

FIG. 8A is a schematic diagram showing aspects of an example enhanced service set (ESS) 800. The example ESS 800 has a first wireless communication topology. The first wireless communication topology of the example ESS 800 may be formed after the example association process 412 shown in FIGS. 4A and 4B. Particularly, the example ESS 800 includes two basic service sets (BSSs), e.g., a first BSS (BSS1) 810 and a second BSS (BSS2) 820. The BSS1 810 includes a first access point device (AP1) 811; and the BSS2 820 includes a second access point device (AP2) 821. The ESS 800 may include additional or different features, and the components of the ESS 800 may operate as described with respect to FIG. 8A or in another manner.

As shown in FIG. 8A, the STA1 812A belongs to the BSS1 810, and has gone through the association process (e.g., the example association process 412 as shown in FIG. 4B). Thus, the STA1 812A is associated to the AP1 811 in the first wireless communication topology. The STA2 812B and the STA3 822A belong to the BSS2 820 and also have gone through the association process. Thus, the STA2 812B and the STA3 822A are associated to the AP2 821 in the first wireless communication topology. The STA1 812A is connected to the AP1 811 through a first wireless link 813A; the STA2 812B is connected to the AP2 821 through a second wireless link 823B; and the STA 822A is connected to the AP2 821 through a third wireless link 823A. In some instances, frequencies of the first, second, and third wireless links 813A, 823A, and 823B may be the same, and can be determined by the respective AP1 811 or AP2 821. In some instances, the AP1 811 and AP2 821 may operate on different frequencies.

A range of the BSS1 810 is controlled by the AP1 811 and a range of the BSS2 820 is controlled by the AP2 821. All STA devices within the range of a BSS (e.g., the BSS1 810 or the BSS2 820) are within communication range of the BSS, and are capable to join, if they have the required security credentials. The operating frequency used by STA devices belonging to the BSS is controlled by the AP of the BSS (e.g., the AP1 811 of the BSS1 810 or the AP2 821 of the BSS2 820). In some cases, the operating frequency of a BSS may be the same as another, different BSS. In some cases, the operating frequencies of different BSSs in the ESS 800 may be different from one another.

The AP1 811 is the controller for the BSS1 810. The AP1 811 determines the operating frequency of which all associated devices use to communicate. Similarly, the AP2 821 is the controller for the BSS2 820. The AP2 821 determines the operating frequency of which all associated devices use to communicate. In some implementations, one of the AP1 811 or the AP2 821 may take the role of multi-AP controller, which is a role to help optimize and balance all the BSSs (e.g., BSS1 810 and BSS2 820) within the example ESS 800.

The STA2 812B is located in an overlap region 830 of the BSS1 810 and the BSS2 820 where the AP1 811 and AP2 821 are both within a communication range. All STA devices within the overlap region 830 are capable to join either the BSS1 810, or the BSS2 820. In some implementations, the decision for STA devices within this overlap region 830 to associate to either BSS may be determined by the multi-AP controller, which could be either AP1 (811) or AP2 (821). In the example shown in FIG. 8A, the STA2 812B is associated to the AP2 821 of the BSS2 820 in the first wireless communication topology.

Figure 8B:
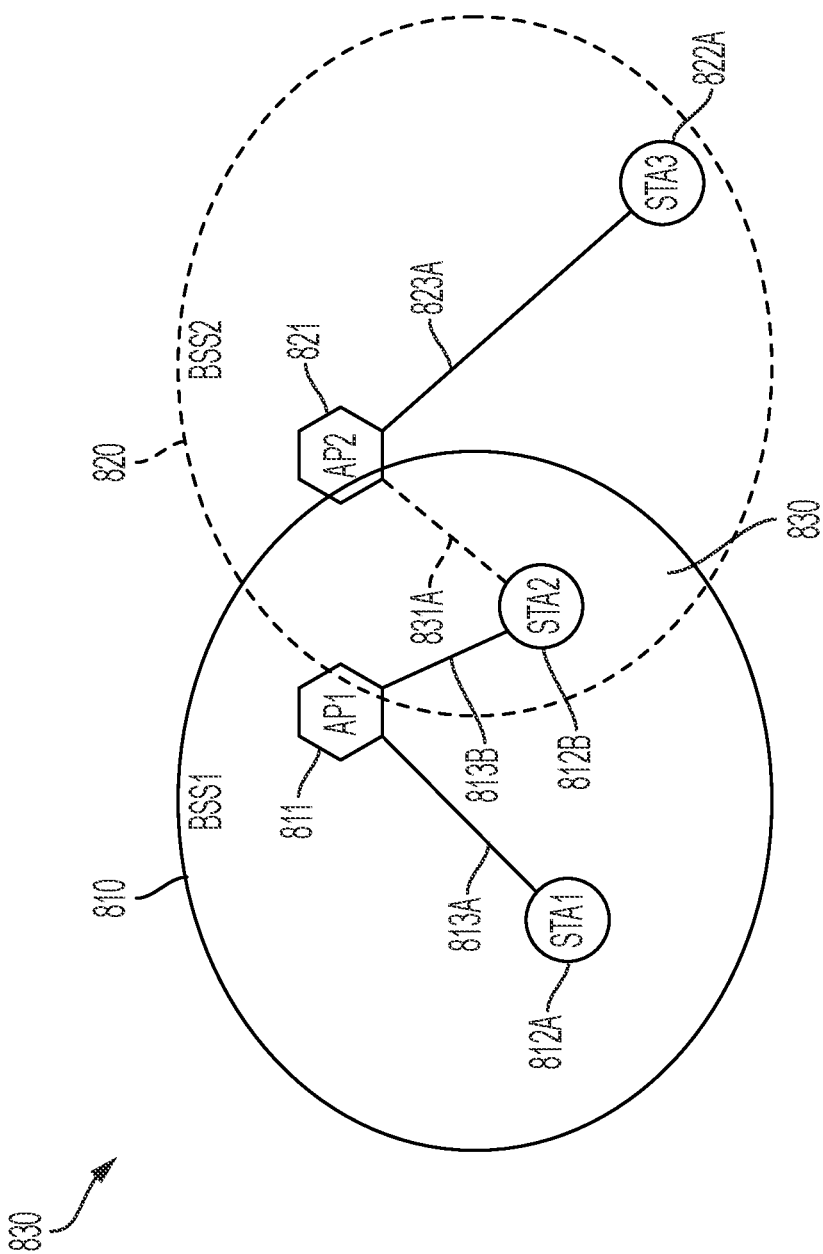
FIG. 8B is a block diagram showing aspects of an example ESS.

FIG. 8B is a schematic diagram showing aspects of an example enhanced service set (ESS) 830. The example ESS 830 has a second wireless communication topology. The second wireless communication topology of the example ESS 830 may be formed after the example topology optimization process 414 shown in FIGS. 4A and 4C. Particularly, the example ESS 830 includes two basic service sets (BSSs), e.g., a first BSS (BSS1) 810 and a second BSS (BSS2) 820. The BSS1 810 includes a first access point device (AP1) 811; and the BSS2 820 includes a second access point device (AP2) 821. The ESS 830 may include additional or different features, and the components of the ESS 830 may operate as described with respect to FIG. 8B or in another manner.

As shown in FIG. 8B, the STA2 812B, which was previously associated with the AP2 821 as shown in the ESS 800 with the first wireless communication topology shown in FIG. 8A, is associated with the AP1 811 in the second wireless communication topology. In this case, the STA2 812B has gone through a de-association process and a new association process. The wireless link 813A between the STA1 812A and the AP1 811, as well as the wireless link 823A between the STA3 822A and the AP2 821 in the second wireless communication topology shown in FIG. 8B are the same as the respective wireless links in the first wireless communication topology shown in FIG. 8A. The STA2 812B is connected to the AP1 811 through a fourth wireless link 813B. In some instances, an operating frequency of the fourth wireless link 813B may be the same as that of the first and second wireless links 813A, 823A, and can be determined by the AP1 811.

A wireless communication topology of an ESS can be controlled, tuned, and otherwise modified. As shown in FIGS. 8A and 8B, the first and second wireless communication topologies of the ESS 800, 830 are different, e.g., the STA2 812B is associated to the AP2 821 in the first wireless communication topology, but associated to the AP1 811 in the second wireless communication topology. In this case, due to load balancing and network optimization operations performed by the multi-AP controller which may be AP1, AP2, cloud based logic, or another device, a decision may be made to have STA2 812B associated with the first BSS1 defined by the first AP1 811 instead of the second BSS2 defined by the second AP2 821. The criteria used by the multi-AP controller may be based on optimizing wireless data communication requirements instead of motion sensing requirements.

As shown in FIG. 8B, the STA2 812B is within the overlap region 830 between the BSS1 810 and the BSS2 820. For the purpose of motion sensing measurement, the wireless link 813B between the STA2 812B and the AP1 811 may not be perfect for motion sensing measurement (for example, the wireless link 813B has a vertical footprint across two levels in a home). A wireless motion sensing link 831A (dotted line) representing the channel between the STA2 812B and the AP2 821 can be formed. In some examples, the STA2 812B may illuminate the wireless motion sensing link 831A at a predetermined time. Channel information of the wireless motion sensing link can be determined by the AP2 821 and transmitted to a sensing processor. In some examples, the AP2 821 may illuminate the wireless motion sensing link 831A and the channel information of the wireless motion sensing link 831A can be determined by the STA2 812B and transmitted to the associated AP1 811 via the wireless link 813B and further to a sensing processor.

FIG. 9A is a ladder diagram showing aspects of an example association process 900 and an example topology optimization process 910. The example association process 900 can be performed between a client station device (STA2 902) and an access point device (AP2 904B). For example, the client station device (STA2 902) and the access point device (AP2 904B) may be implemented as the STA2 812B and the AP2 821 in the example ESS 800 shown in FIG. 8A. The example topology optimization process 910 can be performed between a client station device (STA2 902), a first access point device (AP1 904A), and a second access point device (AP2 904B). The client station device (STA2 902) is associated with the second access point device (AP2 904B) and is not associated with the first access point device (AP1 904A). The wireless communication topology of the ESS is optimized by associating the client station device (STA2 902) with the first access point device (AP1 904A). For example, the client station device (STA2 902), the first access point device (AP1 904A), and the second access point device (AP2 904B) may be implemented as the STA2 812B, the AP1 811, and the AP2 821, respectively, in the example ESS 830 shown in FIG. 8B. The example processes 900 and 910 as shown in FIG. 9A may include additional or different operations, including operations performed by additional or different components, and the operations may be performed in the order shown or in another order. In some cases, operations in the example processes 900 and 910 as can be combined, iterated or otherwise repeated, or performed in another manner.

In some implementations, during the association process 900, an authentication process is performed between the STA2 902 and the AP2 904B. In some instances, an authentication process includes a 4-way handshake where the STA validates its identity to the AP and establishes data encryption. As shown in FIG. 9A, an association request is transmitted from the STA2 902 to the AP2 904B. In some implementations, the association request includes capabilities of the STA devices and requested operating parameters. After receiving the association request, the AP2 904B may approve or disapprove the connection of the STA device to the wireless communication network. In some instance, in response to approving the connection of the STA device to the wireless communication network an association identifier (AID) may be assigned to the STA device and an association response is transmitted from the AP2 904B to the STA2 902. In response to disapproving the connection of the STA device to the wireless communication network, the reason for the disapproval can be shared. In certain instances, the STA2 902 is associated with the AP2 904B and becomes a part of a BSS defined by the AP2 904B (e.g., the second BSS2 820 in FIG. 8A). In some implementations, the association process 900 may be implemented as the example association process 412 as described in FIGS. 4A and 4B, or in another manner.

In some implementations, during the topology optimization process 910, a BSS transition management request is transmitted from the AP2 904B to the STA2 902. In some instances, a BSS transition management request includes a request to move to another BSS within the ESS. When the BSS transition management request is received by the STA2 902, the STA2 902 is suggested to act and move to the suggested BSS. In some instances, a BSS transition management response is transmitted from the STA2 902 to the AP2 904B. In some implementations, after the STA2 902 becomes unassociated with the AP2 904B, a new association process is performed to associate the STA2 902 to the AP1 904A according to the association process 900.

Figure 9B:
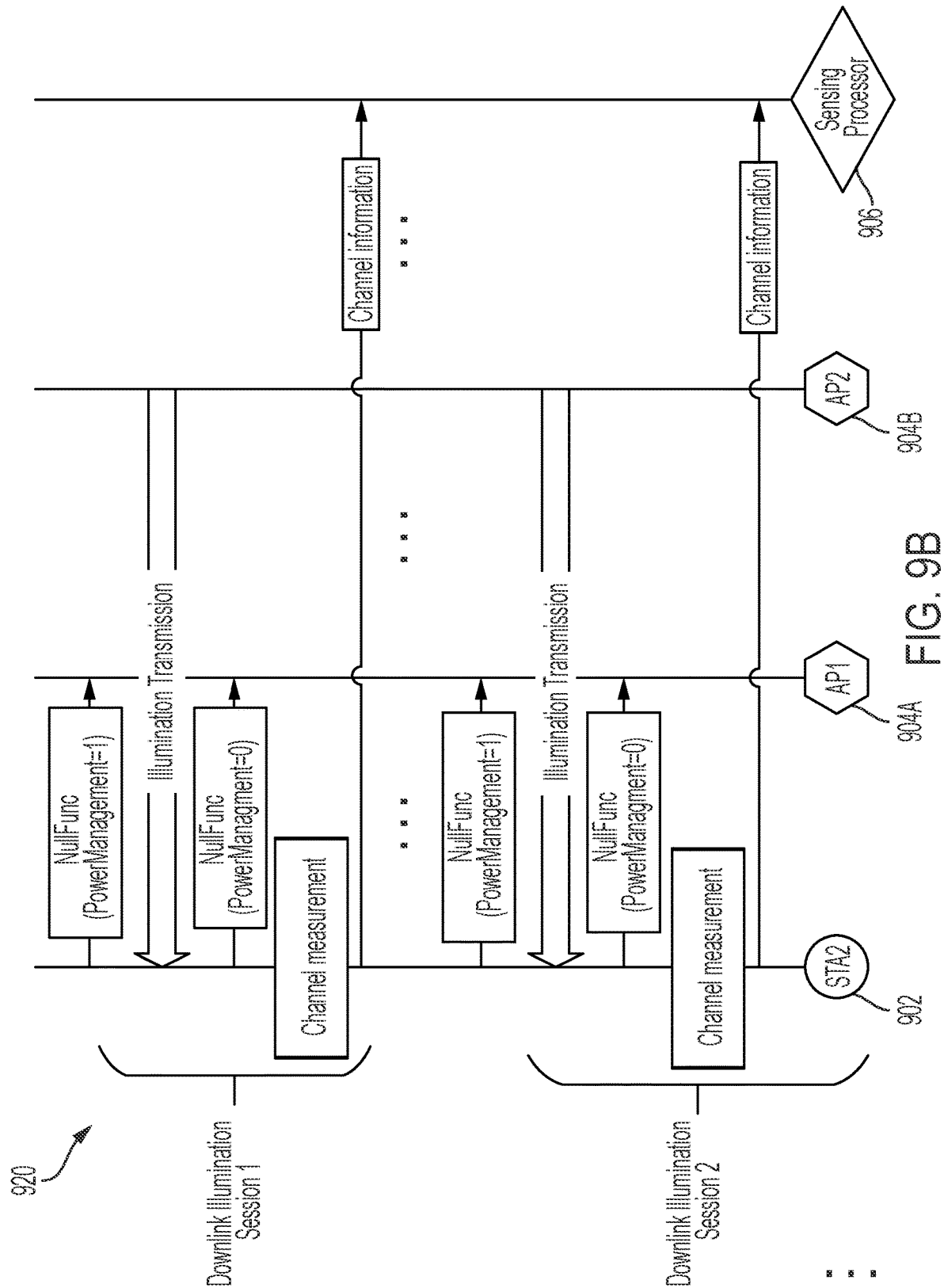
FIGS. 9B-9C are ladder diagrams showing aspects of example motion sensing measurement processes with respect to the example ESS shown in FIG. 8B.
Figure 9C:
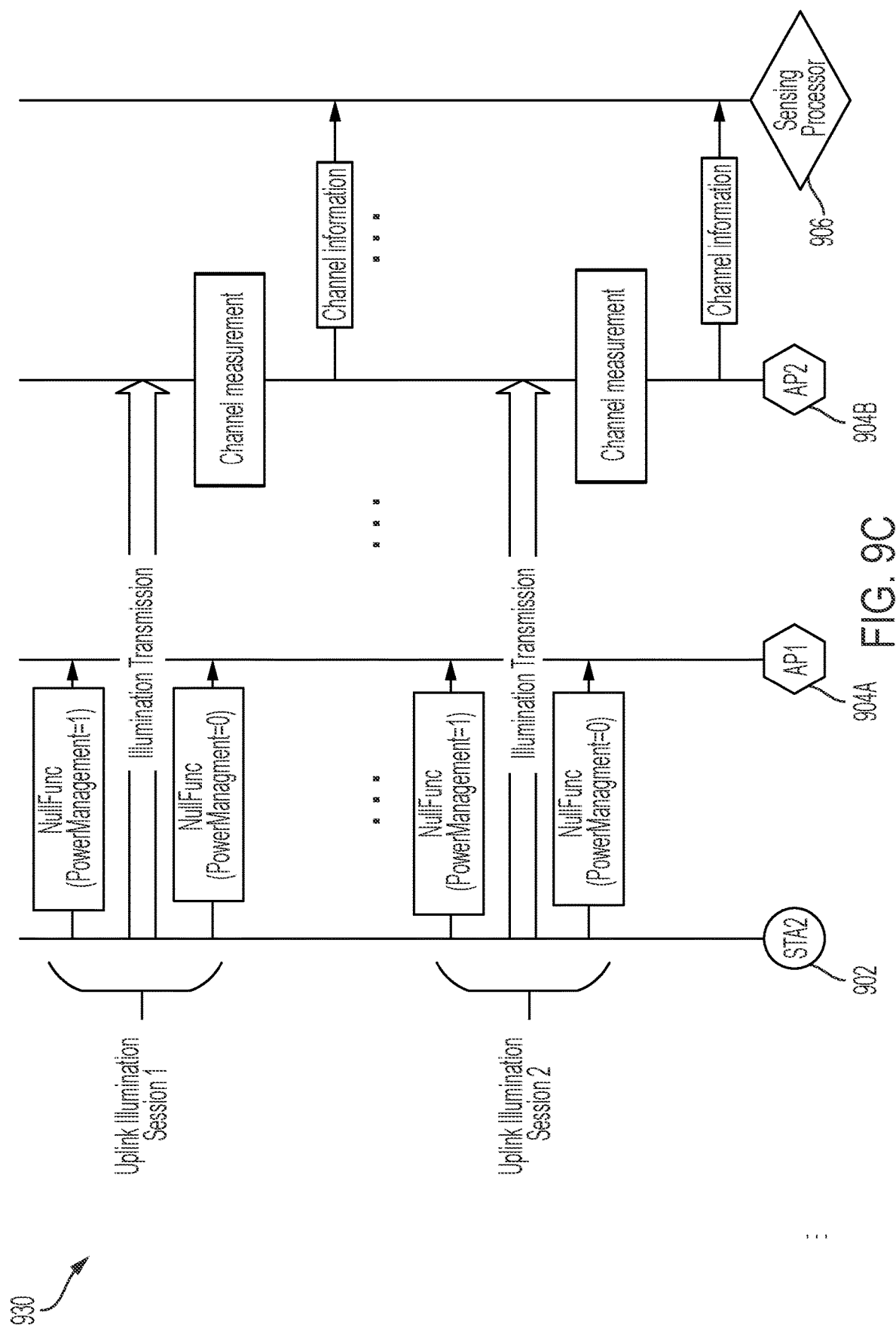

FIGS. 9B-9C are ladder diagrams showing aspects of example motion sensing measurement processes 920, 930. The example motion sensing measurement processes 920, 930 can be performed between a client station device (STA2 902) and an access point device (AP2 904B). In this case, the STA2 902 is associated with the first access point device (AP1 904A) and not associated with the second access point device (AP2 904B); and a wireless motion sensing link exists between the STA2 902 and the AP2 904B on which a motion sensing measurement is performed. For example, the STA2 902 and the AP2 904B may be implemented as the STA2 812B and the AP2 821 in the example ESS 830 shown in FIG. 8B. The example processes 920 and 930 as shown in FIGS. 9B-9C may include additional or different operations, including operations performed by additional or different components, and the operations may be performed in the order shown or in another order. In some cases, operations in the example processes 920 and 930 as shown in FIGS. 9B-9C as can be combined, iterated or otherwise repeated, or performed in another manner.

In some implementations, the motion sensing measurement process 920 is a downlink illumination process during which an illumination transmission is performed from the AP2 904B to the STA2 902. In some instances, the motion sensing measurement process 920 may be implemented as the downlink illumination process 422 as described in FIGS. 4A and 4E, or in another manner. As shown in FIG. 9B, the motion sensing measurement process 920 includes multiple illumination sessions which are performed according to a predetermined schedule. Prior to the illumination transmission, a NullFunc message is transmitted from the STA2 902 to the AP1 904A for the purpose of utilizing the 802.11 defined sleep mechanism to indicate it will be momentarily unavailable. In some instances, a NullFunc message can be used to inform the AP1 904A that the STA2 902 will not be available for a specified amount of time. For example, in the MAC header, a PowerManagement bit with a value of 1 (e.g., PowerManagement=1) may be included in a NullFunc message. After receiving the NullFunc message, the wireless data communication between the STA2 902 and the AP1 904A is interrupted. In some cases, communication data to the STA2 902 may be buffered in the AP1 904A until the illumination process is completed and the communication between the STA 902 and the AP1 904A is re-established. In some implementations, a CIS value on the wireless motion sensing link between the STA2 902 and the AP2 904B is measured by the STA2 902 during the illumination process. Once the illumination process is completed, a second NullFunc message is transmitted from the STA2 902 to the AP1 904A to inform the AP1 904A that the STA2 902 becomes available, for example by setting the value of the PowerManagement bit to 0 (e.g., PowerManagement=0). In some implementations, process described in FIG. 9B is performed when the AP1 904A and AP2 904B are using different communication channels (e.g., different frequencies). The determined channel information is then transmitted from the STA2 902 to a sensing processor 906. In certain instances, the sensing processor 906 may be operated as the AP1 904A, the AP2 904B, the multi-AP controller, a device on the cloud, or another device, where a sensing algorithm can be performed based on the determined channel information received from the STA2 902.

In some implementations, the downlink illumination session may be repeated after a time period, where a second downlink illumination session can be performed. Between the two scheduled downlink illumination sessions during which the STA2 is in its motion sensing mode, the STA2 902 can return to its wireless communication mode, for example, to transmit data to or receive data from the associated AP1 904A. The downlink illumination process may be performed by multiple client stations and an access point. All the client stations that have their respective wireless motion sensing links formed with the access point and have illumination sessions scheduled can perform the downlink illumination process with the access point. In this case, the access point may broadcast an illumination message which can be received by multiple client station devices.

In some implementations, the motion sensing measurement process 930 is an uplink illumination process during which an illumination transmission is performed from the STA2 902 to the AP2 904B. In some instances, the motion sensing measurement 930 may be implemented as the uplink illumination process 424 as described in FIGS. 4A and 4F, or in another manner. As shown in FIG. 9C, the motion sensing measurement process 930 includes multiple illumination sessions which are performed according to a predetermined schedule.

As shown in FIG. 9C, the motion sensing measurement process 930 includes multiple illumination sessions which are performed according to a predetermined schedule. Prior to the illumination transmission, a first NullFunc message is transmitted from the STA2 902 to the AP1 904A. In some instances, the first NullFunc message can be used to inform the AP1 904A that the STA2 902 will not be available at a scheduled time when an illumination session is performed. For example, a PowerManagement bit with a value of 1 (e.g., PowerManagement=1) may be included in the first NullFunc message. In some implementations, channel information on the wireless motion sensing link between the STA2 902 and the AP2 904B is measured by the AP2 904B during the illumination process. The channel information is then transmitted from the AP2 904B to a sensing processor. Once the illumination process is completed, a second NullFunc message is transmitted from the STA2 902 to the AP1 904A to inform the AP1 904A that the STA2 902 becomes available, for example, by setting the value of the PowerManagement bit to 0 (e.g., PowerManagement=0). In some implementations, the process described in FIG. 9C is performed when the AP1 904A and AP2 904B are using different communication channels (e.g., different frequency).

In some instances, a sensing processor may be the AP1 904A, the AP2 904B, or another wireless communication device within the ESS (e.g., the ESS 800, 830 as shown in FIGS. 8A-8B). In some implementations, each of the access points within the ESS that are participating the motion sensing measurement process includes a sensing agent.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, a motion sensing topology of a multi-AP wireless communication network can be controlled.

In a first example, a method is performed by a multi-access point (multi-AP) controller of a multi-AP wireless communication network. The multi-AP wireless communication network includes a first AP device and a second AP device. A wireless communication topology of the multi-AP wireless communication network is identified. When the wireless communication topology is identified, a first client station device being associated with the first AP device in the multi-AP wireless communication network is identified. A motion sensing topology that is different from the wireless communication topology is defined. The motion sensing topology includes a wireless motion sensing link between the first client station device and the second AP device. A motion sensing measurement based on the motion sensing topology is initiated. The motion sensing measurement uses the wireless motion sensing link between the first client station device and the second AP device while the first client station device remains associated with the first AP device in the multi-AP wireless communication network.

Implementations of the first example may include one or more of the following features. When the motion sensing topology is defined, the motion sensing topology is initialized to be identical to the wireless communication topology, and after the motion sensing topology is initialized, the motion sensing topology is modified to include the wireless motion sensing link. When the motion sensing topology is initialized, information describing attributes of the multi-AP wireless communication network is received, and an initial motion sensing topology is defined based on the information. The information describing attributes of the multi-AP wireless communication network includes at least one of: communication frequencies of AP devices in the multi-AP wireless communication network; a list of AP devices and their associated client station devices; or a list of AP devices that respective client station devices are within communication ranges of. When the motion sensing topology is defined, the wireless motion sensing link is defined to improve motion detection capabilities.

Implementations of the first example may include one or more of the following features. Application inputs are received by the multi-AP controller of the multi-AP wireless communication network. The application inputs are used as constraints in defining the motion sensing topology. When the motion sensing measurement is initialized, a series of illumination sessions on the wireless motion sensing link is scheduled. Each illumination session in the series of illumination sessions includes a downlink illumination process. Each illumination session in the series of illumination sessions includes an uplink illumination process. When the motion sensing measurement is initialized, information identifying the scheduled series of illumination sessions is sent to the second AP device and the first client station device.

In a second example, a system includes a first access point device, a second AP device, and a multi-AP controller in a multi-AP wireless communication network. The multi AP controller is configured to perform one or more operations of the first example.

In a third example, a non-transitory computer-readable medium stores instructions that are operable when executed by a multi-AP controller in a multi-AP wireless communication network comprising a first AP device and a second AP device, to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the description above.

What is claimed is:

1. A method performed by a multi-access point (multi-AP) controller of a multi-AP wireless communication network, the multi-AP wireless communication network comprising a first access point (AP) device and a second AP device, the method comprising:
   identifying a wireless communication topology of the multi-AP wireless communication network, wherein identifying the wireless communication topology comprises identifying that a first client station device is associated with the first AP device in the multi-AP wireless communication network;
   defining a motion sensing topology that is different from the wireless communication topology, the motion sensing topology comprising a wireless motion sensing link between the first client station device and the second AP device; and
   initiating a motion sensing measurement based on the motion sensing topology, wherein the motion sensing measurement uses the wireless motion sensing link between the first client station device and the second AP device while the first client station device remains associated with the first AP device in the multi-AP wireless communication network.

2. The method of claim 1, wherein defining the motion sensing topology comprises:
   initializing the motion sensing topology to be identical to the wireless communication topology; and
   after initializing the motion sensing topology, modifying the motion sensing topology to include the wireless motion sensing link.

3. The method of claim 2, wherein initializing the motion sensing topology comprises:
   receiving information describing attributes of the multi-AP wireless communication network; and
   defining an initial motion sensing topology based on the information.

4. The method of claim 3, wherein the information comprises at least one of:
- communication frequencies of AP devices in the multi-AP wireless communication network;
- a list of AP devices and their associated client station devices; or
- a list of AP devices that respective client station devices are within communication ranges of.

5. The method of claim 1, wherein defining the motion sensing topology comprises defining the wireless motion sensing link to improve motion detection capabilities.

6. The method of claim 1, further comprising:
receiving application inputs; and
using the application inputs as constraints in defining the motion sensing topology.

7. The method of claim 1, wherein initiating the motion sensing measurement comprises scheduling a series of illumination sessions on the wireless motion sensing link.

8. The method of claim 7, wherein each illumination session in the series of illumination sessions comprises a downlink illumination process.

9. The method of claim 7, wherein each illumination session in the series of illumination sessions comprises an uplink illumination process.

10. The method of claim 1, wherein initiating the motion sensing measurement comprises sending information identifying the scheduled series of illumination sessions to the second AP device and the first client station device.

11. A system, comprising:
- a first access point (AP) device and a second AP device in a multiple-access point (multi-AP) wireless communication network; and
- a multi AP controller configured to perform operations comprising:
  - identifying a wireless communication topology of the multi-AP wireless communication network, wherein identifying the wireless communication topology comprises identifying that a first client station device is associated with the first AP device in the multi-AP wireless communication network;
  - defining a motion sensing topology that is different from the wireless communication topology, the motion sensing topology comprising a wireless motion sensing link between the first client station device and the second AP device; and
  - initiating a motion sensing measurement based on the motion sensing topology, wherein the motion sensing measurement uses the wireless motion sensing link between the first client station device and the second AP device while the first client station device remains associated with the first AP device in the multi-AP wireless communication network.

12. The system of claim 11, wherein defining the motion sensing topology comprises:
- initializing the motion sensing topology to be identical to the wireless communication topology; and
- after initializing the motion sensing topology, modifying the motion sensing topology to include the wireless motion sensing link.

13. The system of claim 12, wherein initializing the motion sensing topology comprises:
- receiving information describing attributes of the multi-AP wireless communication network; and
- defining an initial motion sensing topology based on the information.

14. The system of claim 13, wherein the information comprises at least one of:
- communication frequencies of AP devices in the multi-AP wireless communication network;
- a list of AP devices and their associated client station devices; or
- a list of AP devices that respective client station devices are within communication ranges of.

15. The system of claim 11, wherein defining the motion sensing topology comprises defining the wireless motion sensing link to improve motion detection capabilities.

16. The system of claim 11, further comprising:
receiving application inputs; and
using the application inputs as constraints in defining the motion sensing topology.

17. The system of claim 11, wherein initiating the motion sensing measurement comprises scheduling a series of illumination sessions on the wireless motion sensing link.

18. The system of claim 17, wherein each illumination session in the series of illumination sessions comprises a downlink illumination process.

19. The system of claim 17, wherein each illumination session in the series of illumination sessions comprises an uplink illumination process.

20. A non-transitory computer-readable medium comprising instructions that are operable, when executed by data processing apparatus, to perform operations of a multi-access point (multi-AP) controller of a multi-AP wireless communication network, the multi-AP wireless communication network comprising a first access point (AP) device and a second AP device, the operations comprising:
- identifying a wireless communication topology of a multi-AP wireless communication network, wherein identifying the wireless communication topology comprises identifying that a first client station device is associated with the first AP device in the multi-AP wireless communication network;
- defining a motion sensing topology that is different from the wireless communication topology, the motion sensing topology comprising a wireless motion sensing link between the first client station device and the second AP device; and
- initiating a motion sensing measurement based on the motion sensing topology, wherein the motion sensing measurement uses the wireless motion sensing link between the first client station device and the second AP device while the first client station device remains associated with the first AP device in the multi-AP wireless communication network.

* * * * *

UNITED STATES PATENT AND TRADEMARK OFFICE
CERTIFICATE OF CORRECTION

PATENT NO. : 11,304,254 B2
APPLICATION NO. : 17/462661
DATED : April 12, 2022
INVENTOR(S) : Omer et al.

It is certified that error appears in the above-identified patent and that said Letters Patent is hereby corrected as shown below:

In the Specification

Column 9, Line 42, Delete "u)$_n$)." and insert -- $\omega_n$). -- therefor

Column 27, Line 5, Delete "720" and insert -- 740 -- therefor

Column 27, Line 32, Delete "STA" and insert -- STA3 -- therefor

Column 30, Line 47, Delete "STA" and insert -- STA2 -- therefor

Signed and Sealed this
Seventh Day of June, 2022

*Katherine Kelly Vidal*

Katherine Kelly Vidal
*Director of the United States Patent and Trademark Office*